United States Patent
Chui et al.

(10) Patent No.: US 6,463,485 B1
(45) Date of Patent: *Oct. 8, 2002

(54) SYSTEM FOR PROVIDING CELL BUS MANAGEMENT IN A SWITCH PLATFORM INCLUDING A WRITE PORT CELL COUNT IN EACH OF A PLURALITY OF UNIDIRECTIONAL FIFO FOR INDICATING WHICH FIFO BE ABLE TO ACCEPT MORE CELL

(75) Inventors: Gene Chui, Campbell; Lambert Fong; Eugene Wang, both of Fremont, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,881

(22) Filed: Jun. 3, 1998

(51) Int. Cl.⁷ .............................. G06F 13/14; H04J 3/00
(52) U.S. Cl. .............................. 710/52; 710/57; 370/229
(58) Field of Search .............................. 710/52, 53, 57, 710/34; 370/229, 237; 711/170

(56) References Cited

U.S. PATENT DOCUMENTS

| | | | | |
|---|---|---|---|---|
| 4,535,427 | * | 8/1985 | Jiang | 365/205 |
| 4,740,958 | * | 4/1988 | Duxbury et al. | 370/94 |
| 4,805,199 | * | 2/1989 | Muramatsu | 377/39 |
| 4,864,543 | * | 9/1989 | Ward et al. | 365/221 |
| 5,224,093 | | 6/1993 | Denzel et al. | |
| 5,224,099 | | 6/1993 | Corbalis et al. | |
| 5,295,246 | * | 3/1994 | Bischoff et al. | 395/250 |
| 5,313,454 | | 5/1994 | Bustini et al. | |
| 5,317,562 | | 5/1994 | Nardin et al. | |
| 5,359,592 | | 10/1994 | Corbalis et al. | |
| 5,406,554 | | 4/1995 | Parry | |
| 5,475,857 | * | 12/1995 | Dally | 395/800 |
| 5,513,224 | * | 4/1996 | Holt | 375/372 |
| 5,533,009 | | 7/1996 | Colmant et al. | |
| 5,604,866 | * | 2/1997 | Kolb et al. | 395/200.13 |

(List continued on next page.)

FOREIGN PATENT DOCUMENTS

JP 408137665 A * 5/1996

OTHER PUBLICATIONS

Kuel Y. Kou, Akira Arutaki, and Susumu Iwasakt The Architecture and Implementation of ATM Switch for Broadband ISDN, 1993 IEEE, pp. 8–13, (1993).

(List continued on next page.)

Primary Examiner—Thomas Lee
Assistant Examiner—Thuan Du
(74) Attorney, Agent, or Firm—Blakely, Sokoloff, Taylor & Zafman LLP

(57) ABSTRACT

A method and apparatus for providing cell bus management in a switch platform are provided. Each unidirectional FIFO buffer of a cell bus controller outputs a write port cell count from a write port. A cell count value is programmed at which the write port cell count is outputted. When the write port cell count indicates that the FIFO buffer can not accept additional data or cells, a master bidirectional FIFO unit ceases reading cells to a unidirectional FIFO buffer of the slave bidirectional FIFO unit in response to the write port cell count. Furthermore, the master bidirectional FIFO unit disables a corresponding switch from routing cells to the slave bidirectional FIFO unit in response to the write port cell count; the switch routes the cells to another of the slave bidirectional FIFO units. The master bidirectional FIFO unit resumes reading cells to the second unidirectional FIFO buffer of the slave bidirectional FIFO unit in response to a write port cell count indication that the FIFO buffer can accept additional data or cells. In response, the master bidirectional FIFO unit enables an associated switch to route cells to the slave bidirectional FIFO unit.

47 Claims, 45 Drawing Sheets

U.S. PATENT DOCUMENTS

| | | | |
|---|---|---|---|
| 5,745,488 | * | 4/1998 | Thompson et al. ......... 370/395 |
| 5,809,021 | | 9/1998 | Diaz et al. |
| 5,838,677 | | 11/1998 | Kozaki et al. |
| 5,864,542 | | 1/1999 | Gupta et al. |
| 5,874,846 | * | 2/1999 | Lee ........................... 327/299 |
| 5,940,368 | | 8/1999 | Takamichi et al. |
| 5,953,318 | | 9/1999 | Nattkemper et al. |
| 5,978,359 | | 11/1999 | Caldara et al. |
| 5,987,008 | * | 11/1999 | Simpson et al. ............ 370/236 |
| 5,999,528 | | 12/1999 | Chow et al. |
| 6,011,779 | | 1/2000 | Wills |
| 6,034,945 | | 3/2000 | Hughes et al. |
| 6,091,710 | | 7/2000 | Mawhinney |
| 6,101,184 | * | 8/2000 | Tobe et al. ................. 370/390 |
| 6,118,835 | * | 9/2000 | Barakat et al. ............. 375/372 |
| 6,122,717 | * | 9/2000 | Chan et al. ................. 711/170 |
| 6,144,636 | * | 11/2000 | Aimoto et al. ............. 370/229 |

OTHER PUBLICATIONS

Ioanna Christidou, Loannis Lambadaris, and Raci Masumdar, "Optimal Control of Arrivals ot a Feedback Queueing System," Proceedings of the 27th Conference on Decision and Control, 1988 IEEE, pp. 663–667 (Dec. 1988).

Russell Prettya nd Marianne Morin, "Frame Relay Interworking with Asynchronous Transfer Mode", 1993 IEEE, pp. 1854–1860.

Pierre A. Humblet, "Buffer Allocation for Frame Reassembly and Queueing in ATM Networks," 1994 IEEE, pp. 510–515 (1994).

Martin Taylor, "LAN Emulation over ATM,"Computer Communications 20 (1997), Elsevier Science BV, pp. 48–59 (1997).

Ray Hunt, "ATM–protocols and architecture,"Computer Communications 19 (1996), Elsevier Science BV, pp. 597–611 (1996).

* cited by examiner

| | 0 | | | | | | | |
|---|---|---|---|---|---|---|---|---|
| | CELL BUS HEADER BYTE 0 | CELL BUS HEADER BYTE 1 | CELL BUS HEADER BYTE 2 | CELL BUS HEADER BYTE 3 | ATM HEADER BYTE 1 | ••• | DATA BYTE 46 | DATA BYTE 47 |
| P 7 | | | | | | | | |
| | 0 | 1 | 2 | 3 | 4 | | 54 | 55 |

FIG. 9

| Cell Bus Cycle | TX Frame | Poll | Grant Address | Grant Enable | Reset | Tx Data (To Slave) | Rx Data (From Slave) | Ack_Lo |
|---|---|---|---|---|---|---|---|---|
| 0/58 | 1 | 0 | | 1 | | First Byte of Cell | 0 | |
| 1 | | Odd Request | | | | Byte 2 | First Byte | 1 |
| 2 | | | 0 | 0 | 0 | Byte 3 | Byte 2 | |
| 3 | | 0 | | | | Byte 4 | Byte 3 | |
| 4 | | | | | | Byte 5 | Byte 4 | |
| 5 | | Even Request | | | | Bytes 6-9 | Byte 5 | |
| 6-9 | | | | | | Byte 10 | Bytes 6-9 | |
| 10 | | 0 | Slot to Reset | Reset Type | 1 | Bytes 11-14 | Byte 10 | |
| 11-14 | | | | | | Byte 15 | Bytes 11-14 | |
| 15 | | Odd Ready | | | | Byte 16 | Byte 15 | |
| 16 | 0 | 0 | 0 | 0 | 0 | Byte 17 | Byte 16 | 0 (CBM checks at Cycle 18 only) |
| 17 | | Even Ready | | | | Byte 18 | Byte 17 | |
| 18 | | 0 | | | | Bytes 19-25 | Byte 18 | |
| 19-25 | | Odd Present | | | | Byte 26 | Bytes 19-25 | |
| 26 | | 0 | | | | Bytes 27-33 | Byte 26 | |
| 27-33 | | Even Present | | | | Byte 34 | Bytes 27-33 | |
| 34 | | | | | | Bytes 35-41 | Byte 34 | |
| 35-41 | | | | | | Byte 42 | Bytes 35-41 | |
| 42 | | | | | | | Byte 42 | |

FIG. 18A

| Cell Bus Cycle | TX Frame | Poll | Grant Address | Grant Enable | Reset | Tx Data (To Slave) | Rx Data (From Slave) | Ack_Lo |
|---|---|---|---|---|---|---|---|---|
| 43-49 | | | | | | Bytes 43-49 | Bytes 43-49 | |
| 50 | | 0 | | | | Byte 50 | Byte 50 | |
| 51 | | Odd Stop | Grant | | | Byte 51 | Byte 51 | |
| 52 | | 0 | 0 | 1 | | Byte 52 | Byte 52 | |
| 53 | | | | | | Byte 53 | Byte 53 | |
| 54 | | | | | | Byte 54 | Byte 54 | |
| 55 | | Even Stop | | | | Byte 55 | Byte 55 | |
| 56 | | 0 | | | | Byte 56 | Byte 56 | |
| 57 | | | | | 0 | 0 | 0 | |
| 58/0 | 1 | | | | | First Byte of next cell | | 1 |

FIG. 18B

| Cell Bus Cycle | TX Frame | Poll | Grant Address | Grant Enable | Reset | Tx Data (From CBM) | Rx Data (To CBM) | Ack_Lo |
|---|---|---|---|---|---|---|---|---|
| 0/58 | 1 | Hi-Z | | 1 | | | Hi-Z | 0 |
| 1 | | Odd Request | | | | First Byte of Cell | First Byte | Hi-Z |
| 2 | | | 0 | 0 | 0 | Byte 2 | Byte 2 | |
| 3 | | Hi-Z | | | | Byte 3 | Byte 3 | |
| 4 | | | | | | Byte 4 | Byte 4 | |
| 5 | | Even Request | | | | Byte 5 | Byte 5 | |
| 6-8 | | | | | | Bytes 6-8 | Bytes 6-8 | |
| 9 | | Hi-Z | | | | Byte 9 | Byte 9 | |
| 10 | | | | | | Byte 10 | Byte 10 | |
| 11 | | Odd Ready | Slot to Reset | Reset Type | 1 | Byte 11 | Byte 11 | |
| 12-14 | | | | | | Bytes 12-14 | Bytes 12-14 | |
| 15 | | | | | | Byte 15 | Byte 15 | |
| 16 | | Hi-Z | | | | Byte 16 | Byte 16 | |
| 17 | | | | | | Byte 17 | Byte 17 | 0 |
| 18 | 0 | | | | | Byte 18 | Byte 18 | |
| 19 | | Even Ready | 0 | 0 | 0 | Byte 19 | Byte 19 | |
| 20-24 | | | | | | Bytes 20-24 | Bytes 20-24 | |
| 25 | | | | | | Byte 25 | Byte 25 | |
| 26 | | | | | | Byte 26 | Byte 26 | |

| Cell Bus Cycle | TX Frame | Poll | Grant Address | Grant Enable | Reset | Tx Data (From CBM) | Rx Data (To CBM) | Ack_Lo |
|---|---|---|---|---|---|---|---|---|
| 27 | | Hi-Z | | | | Byte 27 | Byte 27 | |
| 27-32 | | Odd Present | | | | Bytes 27-32 | Bytes 27-32 | |
| 33 | | Hi-Z | | | | Byte 33 | Byte 33 | |
| 34 | | Even Present | | | | Byte 34 | Byte 34 | |
| 35 | | Hi-Z | | | | Byte 35 | Byte 35 | |
| 35-40 | | Odd Stop | | | | Bytes 35-40 | Bytes 35-40 | |
| 41 | | Grant | 0 | | | Byte 41 | Byte 41 | |
| 42 | | Hi-Z | | | | Byte 42 | Byte 42 | |
| 43 | | | | | | Byte 43 | Byte 43 | |
| 43-48 | | Even Stop | | 1 | | Bytes 43-48 | Bytes 43-48 | |
| 49 | | Hi-Z | | | | Byte 49 | Byte 49 | |
| 50 | | | | | | Byte 50 | Byte 50 | |
| 51 | | | | | | Byte 51 | Byte 51 | |
| 52 | | | | | | Byte 52 | Byte 52 | |
| 53 | | | | | | Byte 53 | Byte 53 | |
| 54 | | | | | | Byte 54 | Byte 54 | |
| 55 | | | | | | Byte 55 | Byte 55 | |
| 56 | | | | | | Byte 56 | Byte 56 | |
| 57 | | | | | | First Byte of next cell | Hi-Z | |
| 58/0 | 1 | | | | | 0 | | 0 |

| FIRMWARE INFORMATION | | | | | | CBC HARDWARE INFORMATION | | |
|---|---|---|---|---|---|---|---|---|
| CBC Device Number | Device | Comment | Chassis Slot Number | Cell Bus Number | Physical Slot ID (on that Cell Bus) | QE Chip Number | CBC Chip Logic | QE Chip TX Address | Address Map RAM (Addressed by the QE TX Address) |
| 0 | SM0 | Fast or Slow SM | 1 | 0 | 1 | 0 | CBM0 | 0 | 0x01 |
| 1 | SM1 | Fast or Slow SM | 2 | 0 | 2 | 0 | CBM0 | 1 | 0x02 |
| 2 | SM2 | Fast or Slow SM | 3 | 1 | 3 | 0 | CBM1 | 2 | 0x13 |
| 3 | SM3 | Fast or Slow SM | 4 | 1 | 4 | 0 | CBM1 | 3 | 0x14 |
| 4 | SM4 | Fast or Slow SM | 5 | 2 | 5 | 0 | CBM2 | 4 | 0x25 |
| 5 | SM5 | Fast or Slow SM | 6 | 2 | 6 | 0 | CBM2 | 5 | 0x26 |
| 6 | SM6 | Slow SM only | 17 | 3 | 1 | 0 | CBM3 | 6 | 0x31 |
| 7 | SM7 | Slow SM only | 18 | 3 | 2 | 0 | CBM3 | 7 | 0x32 |
| 8 | SM8 | Slow SM only | 19 | 3 | 3 | 0 | CBM3 | 8 | 0x33 |
| 9 | SM9 | Slow SM only | 20 | 3 | 4 | 0 | CBM3 | 9 | 0x34 |
| 10 | SM10 | Slow SM only | 21 | 3 | 5 | 0 | CBM3 | 10 | 0x35 |
| 11 | SM11 | Slow SM only | 22 | 3 | 6 | 0 | CBM3 | 11 | 0x36 |

FIG. 24A

| CBC Device Number | | Comment | Chassis Slot Number | Cell Bus Number | Physical Slot ID (on that Cell Bus) | QE Chip Number | CBC Chip Logic | QE Chip TX Address | Address Map RAM (Addressed by the QE TX Address) |
|---|---|---|---|---|---|---|---|---|---|
| 12 | MCE | Internal to CBC | N/A | N/A | N/A | 0 | MCE | 12 | 0x40 |
| 13 | Slave | Internal to CBC (RX is Connected to PSM in Slot 8, TX is NOT USED) | 8 for PSM Card in Slot 7, 7 for PSM Card in Slot 8 | N/A | N/A | 0 | CBS | 13 | NOT USED |
| 14-15 | Not Used | NOT USED | N/A | N/A | N/A | 0 | N/A | 14-15 | |
| FIRMWARE INFORMATION | | | | | | | CBC HARDWARE INFORMATION | | |

FIG. 24B

| FIRMWARE INFORMATION | | | | | | CBC HARDWARE INFORMATION | | |
|---|---|---|---|---|---|---|---|---|
| CBC Device Number | Device | Comment | Chassis Slot Number | Cell Bus Number | Physical Slot ID (on that Cell Bus) | QE Chip Number | CBC Chip Logic | QE Chip TX Address | Address Map RAM (Addressed by the QE TX Address) |
| 16 | SM0 | Fast or Slow SM | 9 | 4 | 9 | 1 | CBM0 | 0 | 0x09 |
| 17 | SM1 | Fast or Slow SM | 10 | 4 | 10 | 1 | CBM0 | 1 | 0x0A |
| 18 | SM2 | Fast or Slow SM | 11 | 5 | 11 | 1 | CBM1 | 2 | 0x1B |
| 19 | SM3 | Fast or Slow SM | 12 | 5 | 12 | 1 | CBM1 | 3 | 0x1C |
| 20 | SM4 | Fast or Slow SM | 13 | 6 | 13 | 1 | CBM2 | 4 | 0x2D |
| 21 | SM5 | Fast or Slow SM | 14 | 6 | 14 | 1 | CBM2 | 5 | 0x2E |
| 22 | SM6 | Slow SM only | 25 | 7 | 9 | 1 | CBM3 | 6 | 0x39 |
| 23 | SM7 | Slow SM only | 26 | 7 | 10 | 1 | CBM3 | 7 | 0x3A |
| 24 | SM8 | Slow SM only | 27 | 7 | 11 | 1 | CBM3 | 8 | 0x3B |
| 25 | SM9 | Slow SM only | 28 | 7 | 12 | 1 | CBM3 | 9 | 0x3C |
| 26 | SM10 | Slow SM only | 29 | 7 | 13 | 1 | CBM3 | 10 | 0x3D |
| 27 | SM11 | Slow SM only | 30 | 7 | 14 | 1 | CBM3 | 11 | 0x3E |
| 28 | MCE | Internal to CBC | N/A | N/A | N/A | 1 | MCE | 12 | 0x40 |
| 29 | Slave | Internal to CBC NOT USED | N/A | N/A | N/A | 1 | CBS | 13 | NOT USED |
| 30-31 | Not Used | NOT USED | N/A | N/A | N/A | 1 | N/A | 14-15 | NOT USED |

FIG. 25

| PARAMETER | PURPOSE | CBM Egress FIFO | CBM Ingress FIFO | CBS Ingress FIFO |
|---|---|---|---|---|
| num_bits_in_fifo_word | Number of bits in each FIFO word | 34 | 34 | 34 |
| num_words_in_cell | Number of words in one cell | 14 | 14 | 14 |
| log2_num_words_in_cell | Minimum bits needed to represent num_words_in_cell | 4 | 4 | 4 |
| num_cells_in_fifo | Number of cells in the FIFO | 8 | 8 | 16 |
| log2_num_cells_in_fifo | Minimum bits needed to represent num_cells_in_fifo | 3 | 3 | 4 |
| log2_num_words_in_fifo | Number of bits in FIFO address | 7 | 7 | 8 |
| wclk_2_rclk_ratio | WCLK to RCLK frequency ratio (minimum = 1) - WCLK=50 MHZ RCLK=21 MHZ RATIO=3 WCLK=21 MHZ RCLK=50 MHZ RATIO=1 | 3 | 1 | 1 |
| rclk_2_wclk_ratio | RCLK to WCLK frequency ratio (minimum = 1) - RCLK=50 MHZ WCLK=21 MHZ RATIO=3 RCLK=21 MHZ WCLK=50 MHZ RATIO=1 | 1 | 3 | 3 |

FIG. 30

| NAME | COUNT | DIRECTION | COMMENTS |
|---|---|---|---|
| Write Port Interface | | | |
| write_clk_i | 1 | Input | Write Port Clock |
| wclk_reset_i | 1 | Input | Write Port Reset |
| write_data_i | num_bits_in_fifo_word | Input | Write Data Input |
| write_en_i | 1 | Input | Write Enable |
| write_cell_cntr_o | log2_num_cells_in_fifo | Output | Write Port Cell Count |
| cell_space_avail_o | 1 | Output | Room for at least one more cell |
| Read Port Interface | | | |
| read_clk_i | 1 | Input | Read Port Clock |
| rclk_reset_i | 1 | Input | Read Port Reset |
| read_data_o | num_bits_in_fifo_word | Output | Read Data Output |
| read_en_i | 1 | Input | Read Enable |
| read_cell_cntr_o | log2_num_cells_in_fifo | Output | Read Port Cell Count |
| cell_avail_o | 1 | Output | At least one more cell in FIFO |
| allow_proc_read_i | 1 | Input | Granting Processor Port for reading; When the allow_proc_read_i is asserted, the Read Port is not allowed to read. In addition, the next 2 cycles following the last cycle the allow_proc_read_i is asserted are also not available. |
| Processor Port Interface | | | |

FIG. 31A

| NAME | COUNT | DIRECTION | COMMENTS |
|---|---|---|---|
| proc_read_req_i | 1 | Input | Processor request read operation |
| proc_read_adrs_i | log2_num_words_in_fifo | Input | Processor read address |
| proc_read_data_o | num_bits_in_fifo_word | Output | Processor read data |
| proc_read_done_o | 1 | Output | Processor read request completed |
| BIST Interface | | | |
| bist_test_i | 1 | Input | |
| bist_cntl_i | 1 | Input | |
| brt_flag_o | 1 | Output | |
| bist_complete_o | 1 | Output | |

FIG. 31B

SYSTEM FOR PROVIDING CELL BUS MANAGEMENT IN A SWITCH PLATFORM INCLUDING A WRITE PORT CELL COUNT IN EACH OF A PLURALITY OF UNIDIRECTIONAL FIFO FOR INDICATING WHICH FIFO BE ABLE TO ACCEPT MORE CELL

FIELD OF THE INVENTION

The present invention relates generally to the management of network nodes and, more particularly, to a mechanism for managing cell traffic in a multiservice switch platform.

BACKGROUND OF THE INVENTION

Until recently there has persisted a fundamental dichotomy between different types of telecommunication networks. A first type of telecommunication network, the telephone network, switches and transports predominantly voice, facsimile, and modulation-demodulation system (modem) traffic. A second type of telecommunication network, the data network, switches or routes and transports data between computers.

Telephone networks were developed and deployed earlier, followed by data networks. Telephone network infrastructures are ubiquitous, however, and as a result data networks typically are built, to a limited extent, using some components of telephone networks. For example, the end user access link to a data network in some cases is implemented with a dial-up telephone line. The dial-up telephone line thus connects the end user computer equipment to the data network access gateway. Also, high speed digital trunks interconnecting remote switches and routers of a data network are often leased from telephone carriers.

Nonetheless, telephone and data network infrastructures are usually deployed together with limited sharing of resources, especially with regards to the core components of the networks—the switches and routers that steer the payloads throughout the networks. The cost of this redundancy coupled with advances in data network technologies has led, where possible, to integrated data traffic comprising voice, data, facsimile, and modem information over a unified data network. As such, a data network should now be able to accept, service, and deliver any type of data on a random, dynamic basis using a minimum set of hardware on a single platform.

Multiservice network switches are used to provide a data path, or interface, between multiple networks, each of which may operate using a different type of data or according to a different networking standard protocol. Examples of the networking protocols supported by these multiservice switches include, but are not limited to, frame relay, voice, circuit emulation, T1 channelized, T3 channelized, and Asynchronous Transfer Mode (ATM).

Typical prior art switch platforms handling data of different types, speeds, and bandwidths exhibit a problem in that there is a significant risk of data loss because of the different data parameters. In order to reduce the risk of data loss, the typical prior art switches use first-in-first-out (FIFO) buffers. The problems with the typical prior art FIFOs are numerous but, overall, can be generalized as inflexible and performance limiting. First, the typical prior art FIFOs are limiting in that they are unidirectional and only support data flow in one direction. Next, the interface through the typical prior art FIFO is synchronous, thereby limiting the types of data accepted by the switch platform and the types of subscriber equipment coupled to the platform. Furthermore, the typical prior art FIFO has a fixed-width data path.

The typical prior art FIFO exhibits congestion problems in that it fails to provide adequate information regarding the quantity and contents of the FIFO. For example, the prior art FIFO does not provide quantitative information regarding the availability of cell space in the FIFO, and the cell space availability indications typically provided are based on word boundaries. Additionally, the prior art FIFO fails to provide a way to discard invalid data that has been written to a FIFO. Furthermore, the typical prior art FIFO limits diagnosis and switch platform performance monitoring as it fails to provide for a non-destructive processor read of the FIFO or a diagnostic loopback between multiple FIFOs.

In addition to the aforementioned problems with typical prior art FIFOs, these FIFOs fail to provide fair rate-based bandwidth allocation among cell traffic sources. Instead, the typical prior art FIFOs use a round-robin priority scheme to service the traffic sources, wherein all traffic sources are serviced in consecutive order with equal bandwidth being allocated to each traffic source. In a wide area network, for example, bandwidth allocation is important because customers are serviced and charged according to the bandwidth used. Therefore, a bandwidth allocation scheme that provides equal bandwidth to all traffic sources regardless of source requirements is inefficient and cost ineffective.

Furthermore, the typical prior art FIFO is problematic in that it fails to provide adequate cell traffic congestion management, a failure that results in dropped and lost cells. Furthermore, the prior art FIFO inefficiently manages the routing of information through a switch platform. This inefficiency results from globally assigning the cell bus logical connection number (LCN) and the UDF the same value for each connection. This global assignment tightly couples the LCN address space and the UDF address space, thereby forcing a large portion of the cell bus address space to be unusable. Furthermore, this global assignment requires switch platform software to make queries to multiple switch cards to find an unallocated value for use in both the LCN and the UDF address spaces.

SUMMARY AND OBJECTS OF THE INVENTION

It is therefore an object of the invention to provide fair rate-based cell traffic arbitration and bandwidth allocation between multiple cell traffic sources.

It is a further object of the invention to prevent dropped or lost cells in a switch platform by providing cell bus traffic congestion management.

It is a further object of the invention to provide flexibility and a performance improvement in the translation of cell traffic routing information.

These and other objects of the invention are provided by a method and apparatus for providing cell bus management in a switch platform. Each unidirectional FIFO buffer of a cell bus controller outputs a write port cell count from a write port. A cell count value is programmed at which the write port cell count is outputted. When the write port cell count indicates that the FIFO buffer can not accept additional data or cells, a master bidirectional FIFO unit ceases reading cells to a unidirectional FIFO buffer of the slave bidirectional FIFO unit in response to the write port cell count. Furthermore, the master bidirectional FIFO unit disables a corresponding switch from routing cells to the slave bidirectional FIFO unit in response to the write port cell count; the switch routes the cells to another of the slave bidirectional FIFO units. The master bidirectional FIFO unit resumes reading cells to the second unidirectional FIFO buffer of the slave bidirectional FIFO unit in response to a write port cell count indication that the FIFO buffer can accept additional data or cells. In response, the master bidirectional FIFO unit enables an associated switch to route cells to the slave bidirectional FIFO unit.

Furthermore, each unidirectional FIFO buffer outputs a status indicating space available in the corresponding unidirectional FIFO buffer for at least one more cell. When the space available status indicates that space is not available in the FIFO buffer for at least one more cell, the master bidirectional FIFO unit ceases reading cells to the unidirectional FIFO buffer of the slave bidirectional FIFO unit in response to the space available status. The master bidirectional FIFO unit disables a corresponding switch from routing cells to the slave bidirectional FIFO unit in response to the space available status; the switch routes the cells to another of the slave bidirectional FIFO units. The master bidirectional FIFO unit resumes reading cells to the second unidirectional FIFO buffer of the slave bidirectional FIFO unit in response to a status indicating space is available in the FIFO buffer. In response, the master bidirectional FIFO unit enables an associated switch to route cells to the slave bidirectional FIFO unit.

Other objects, features, and advantages of the invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 9 is a cell format of the ATM mode of one embodiment.

FIG. 18 shows the CBM cell bus signal timing of one embodiment.

FIG. 19 shows the CBS cell bus signal timing of one embodiment.

FIG. 24 is a mapping for a first PSM card in a first slot of one embodiment.

FIG. 25 is a mapping for a second PSM card in a second slot of one embodiment.

FIG. 30 lists the configuration parameters of the bidirectional FIFOs of a CBC of one embodiment.

FIG. 31 lists the input/outputs (I/Os) and a corresponding interface description for the bi-directional FIFOs of a CBC of one embodiment.

DETAILED DESCRIPTION

Intended advantages of the invention described herein may comprise the provision of synchronous parameterized FIFO memory functions for bi-directional data flow through a switch platform, asynchronous read and write ports in a unidirectional FIFO, a FIFO having a programmable cell size, and a FIFO having a programmable word size, but the embodiment is not so limited. Furthermore, intended advantages may comprise the provision of a FIFO that provides quantitative information based on cell boundaries regarding the availability of cell space in the FIFO, a way to discard invalid data written to a FIFO, a non-destructive processor read of a FIFO, and a diagnostic loopback between multiple FIFOs, but the embodiment is not so limited.

Figure 1:
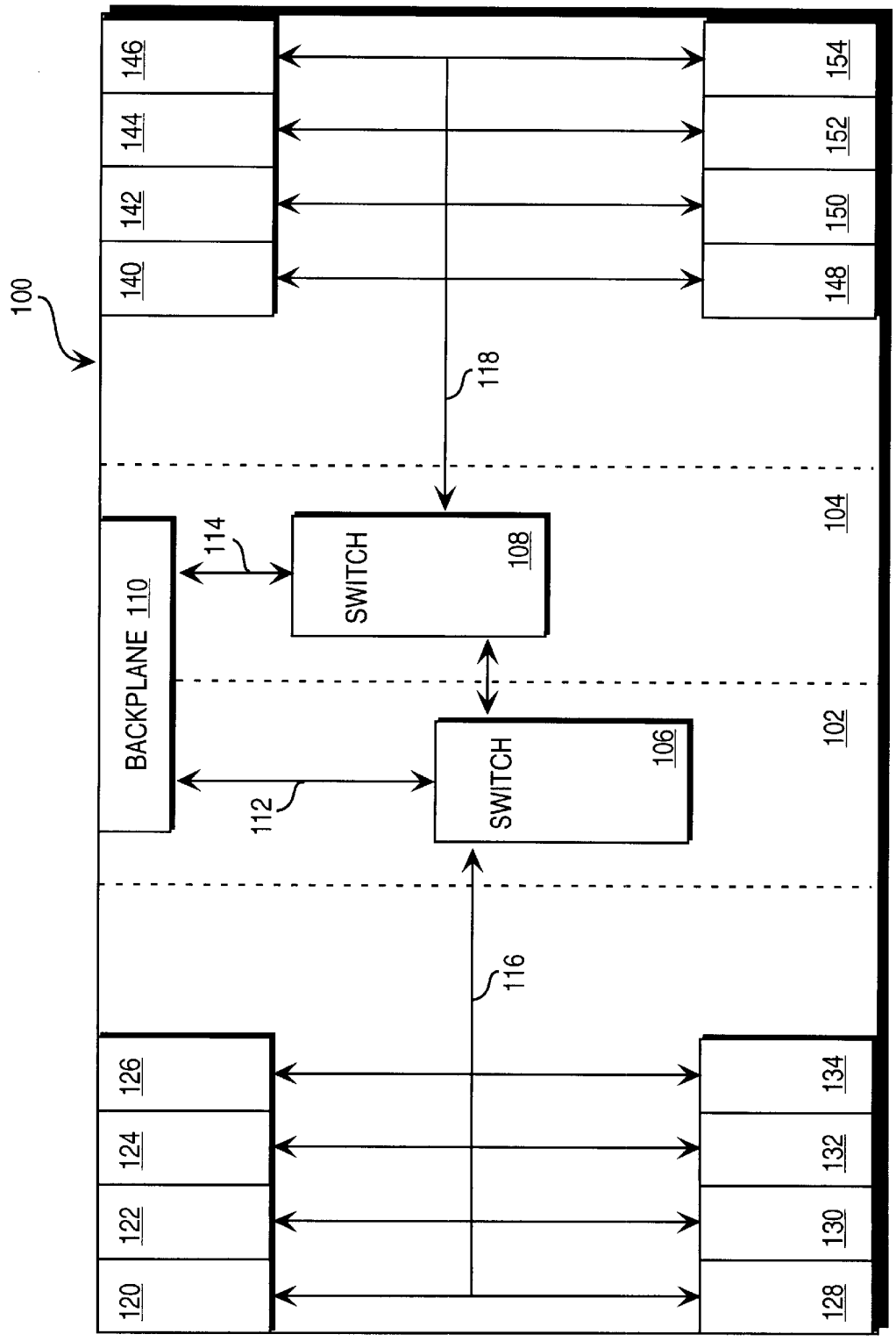
FIG. 1 is a multi-service switch platform of one embodiment. The switch platform comprises two Processor/Switch Modules (PSMs).

FIG. 1 is a multi-service switch platform 100 of one embodiment. The switch platform 100 comprises two Processor/Switch Modules (PSMs) 102–104. Each PSM 102–104 is coupled to communicate between a backplane 110 and eight service modules (SMs) 120–154, but the embodiment is not so limited. The outside interfaces provided by the service modules 120–154 and the PSMs 102–104 provide the user a large selection of interfaces at speeds from DS0 modem access to OC3 ATM interface comprising T1/E1, DS3, OC3, modem, and router communications, but the embodiment is not so limited. The PSM cards 102–104 provide high speed native ATM interfaces through the backplane 110, wherein the interfaces comprise T3, OC3, and OC12 interfaces which can be configured as ATM ports or trunks, but the embodiment is not so limited. In one embodiment, the PSMs 102–104 support switched connections between service module ports and between PSM back card ports. The PSMs 102–104 are coupled to the service modules 120–154 using a service module interface with the physical layer convergence function performed on the PSM. The PSM embodiments support 1.2 Gbps, 15 Gbps, and 45 Gbps thereby allowing support for each of these rates on the same switch node, but the embodiments are not so limited. The higher capacity PSM embodiments may be deployed in configurations where there are broadband interfaces in the network, and trunks can be supplied from a broadband interface.

The switch platform 100 of one embodiment supports applications requiring a combination of switching, routing, and other interface functions. As such, the switch platform may stand alone or function as part of a larger network. Therefore, the switch platform described herein may be configured either as a routing node or a feeder node attached to a router node, but the embodiment is not so limited. As a routing node, the platform will support AutoRoute and PNNI simultaneously.

Figure 2:
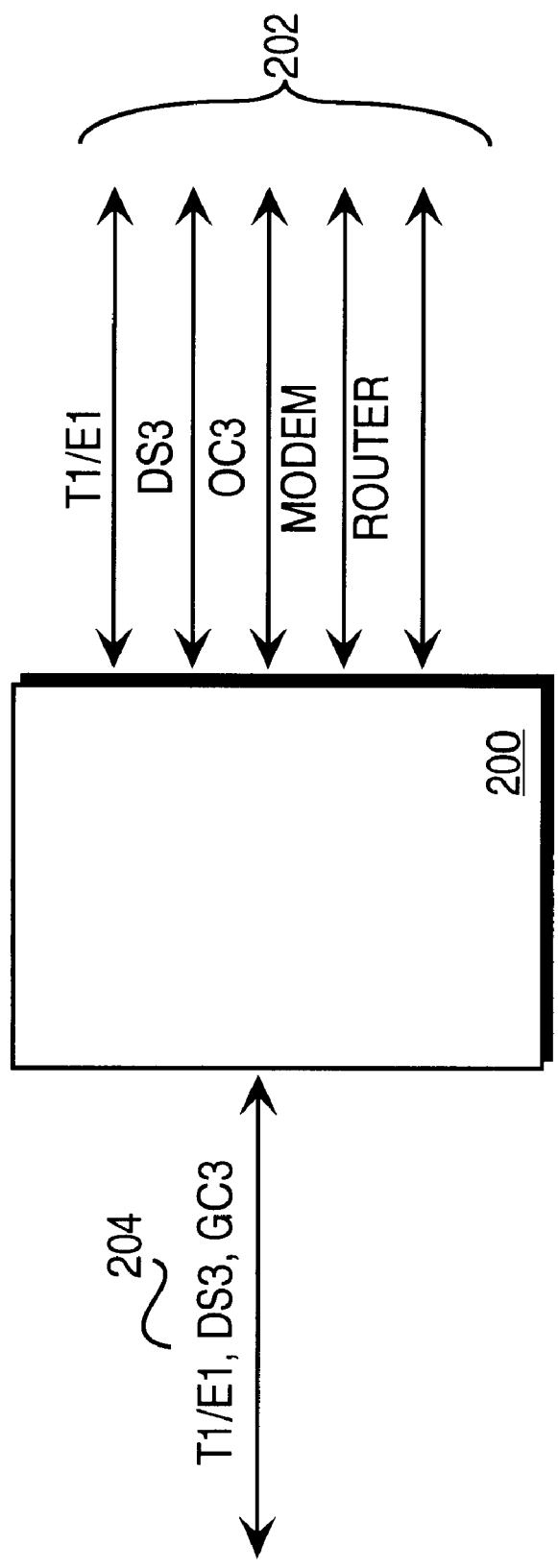
FIG. 2 is a switch platform of one embodiment as a stand alone node.
Figure 3:
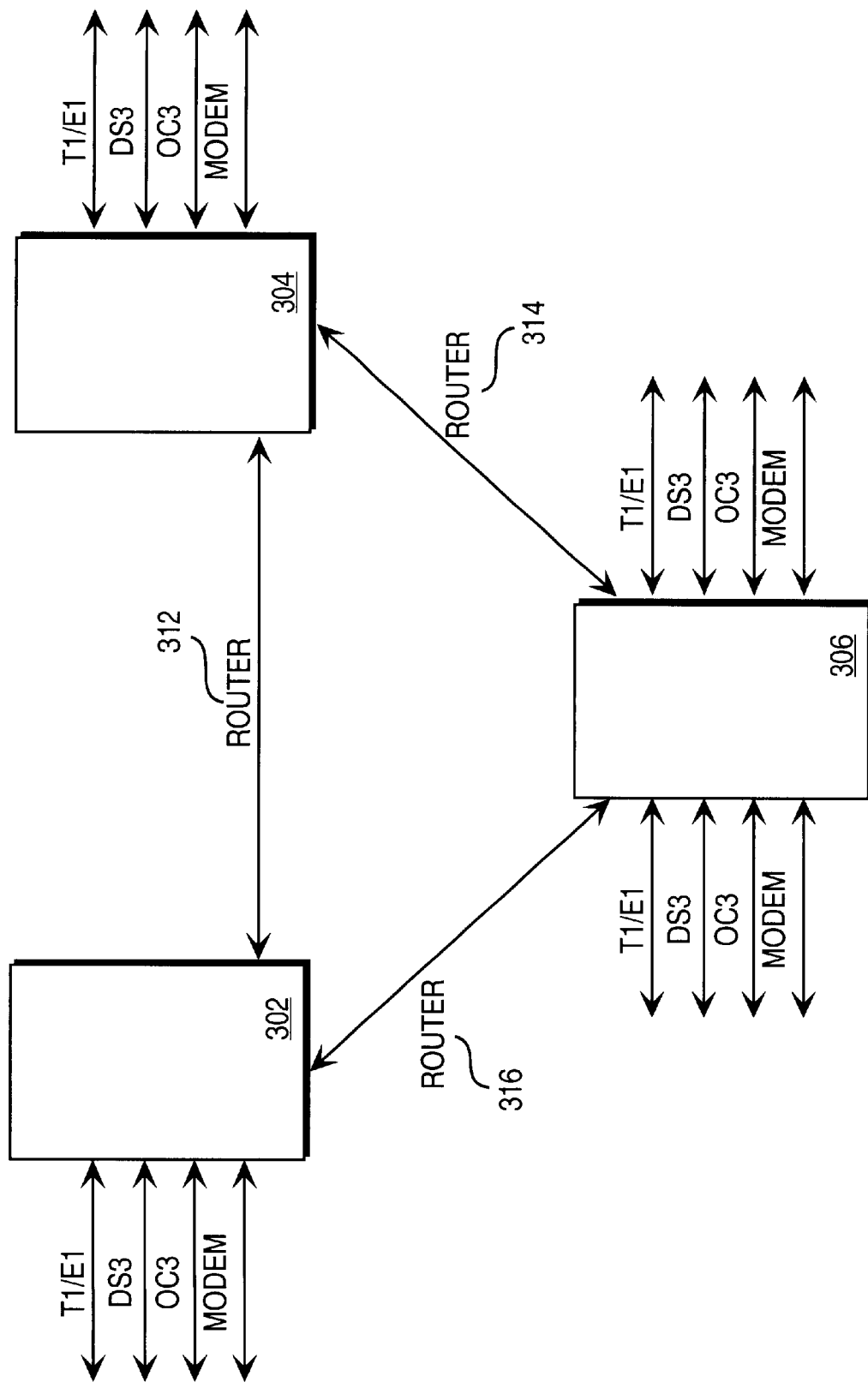
FIG. 3 shows switch nodes of one embodiment connected as a network through router interfaces.
Figure 4:
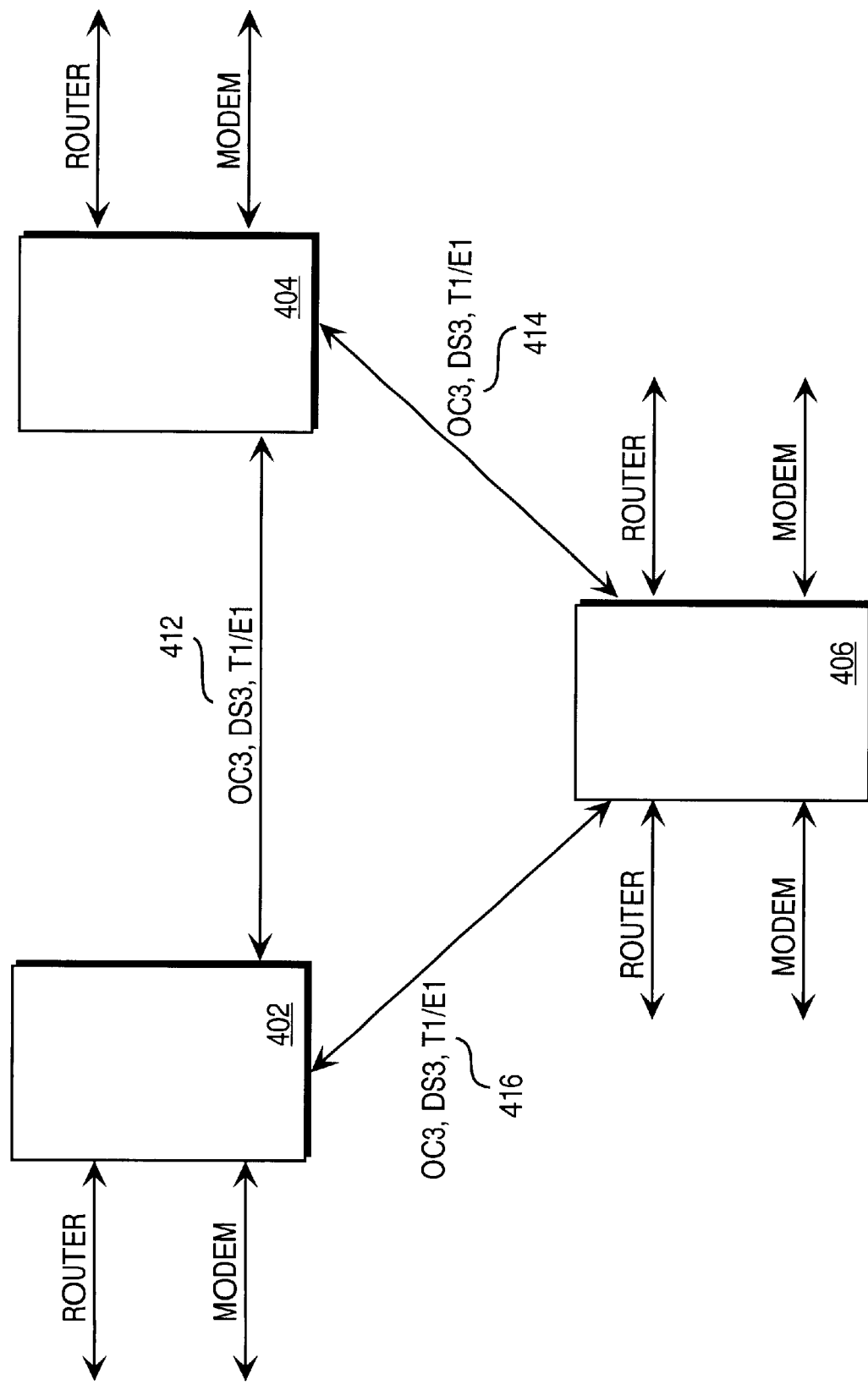
FIG. 4 shows switch nodes of one embodiment connected as a network through ATM interfaces.
Figure 5:
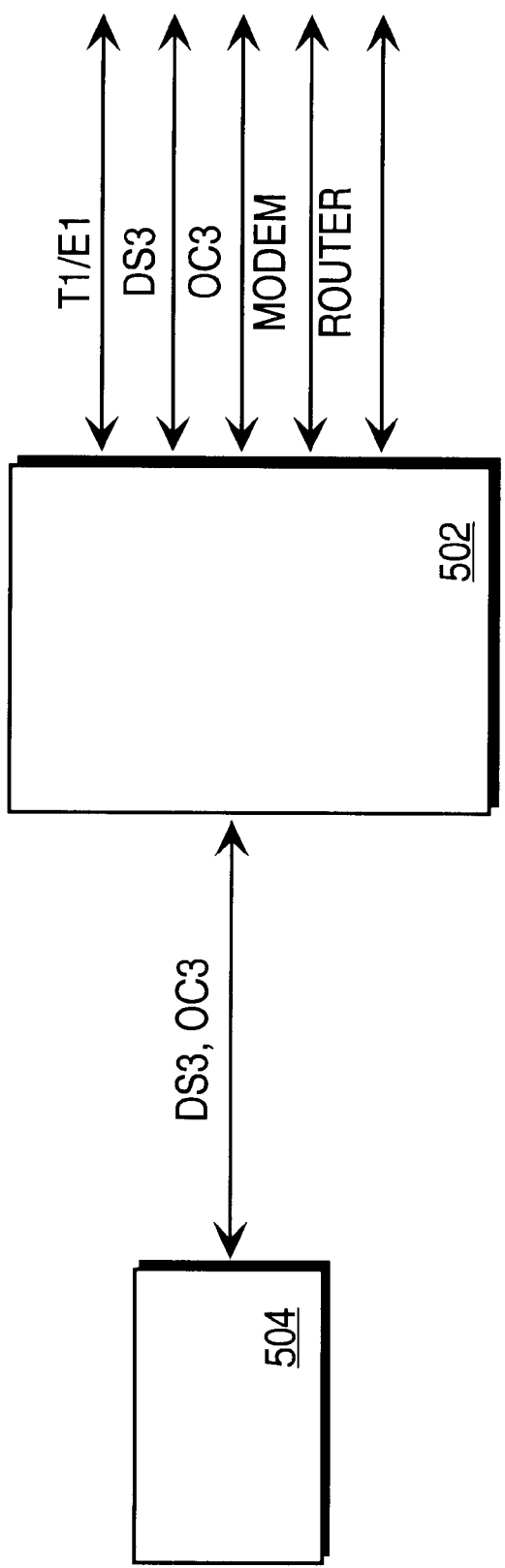
FIG. 5 is a switch of one embodiment as a node in a BPX/IPX network.

FIG. 2 is a switch platform 200 of one embodiment as a stand alone node. Furthermore, multiple nodes can be coupled to form a network. The trunking of the nodes can be through the ATM interfaces 202 provided on the service modules of each switch platform, the ATM interfaces provided on the PSM 204, or a wide variety of interfaces, for example, a 100 mbs Ethernet connection provided through the router interface. FIG. 3 shows switch nodes 302–306 of one embodiment connected as a network through router interfaces 312–316. FIG. 4 shows switch nodes 402–406 of one embodiment connected as a network through ATM interfaces 412–416. Furthermore, the ATM interfaces on the switch nodes of one embodiment provide ATM native connections to other types of network switches. FIG. 5 is a switch platform 502 of one embodiment as a node in a BPX/IPX network 504.

Figure 6:
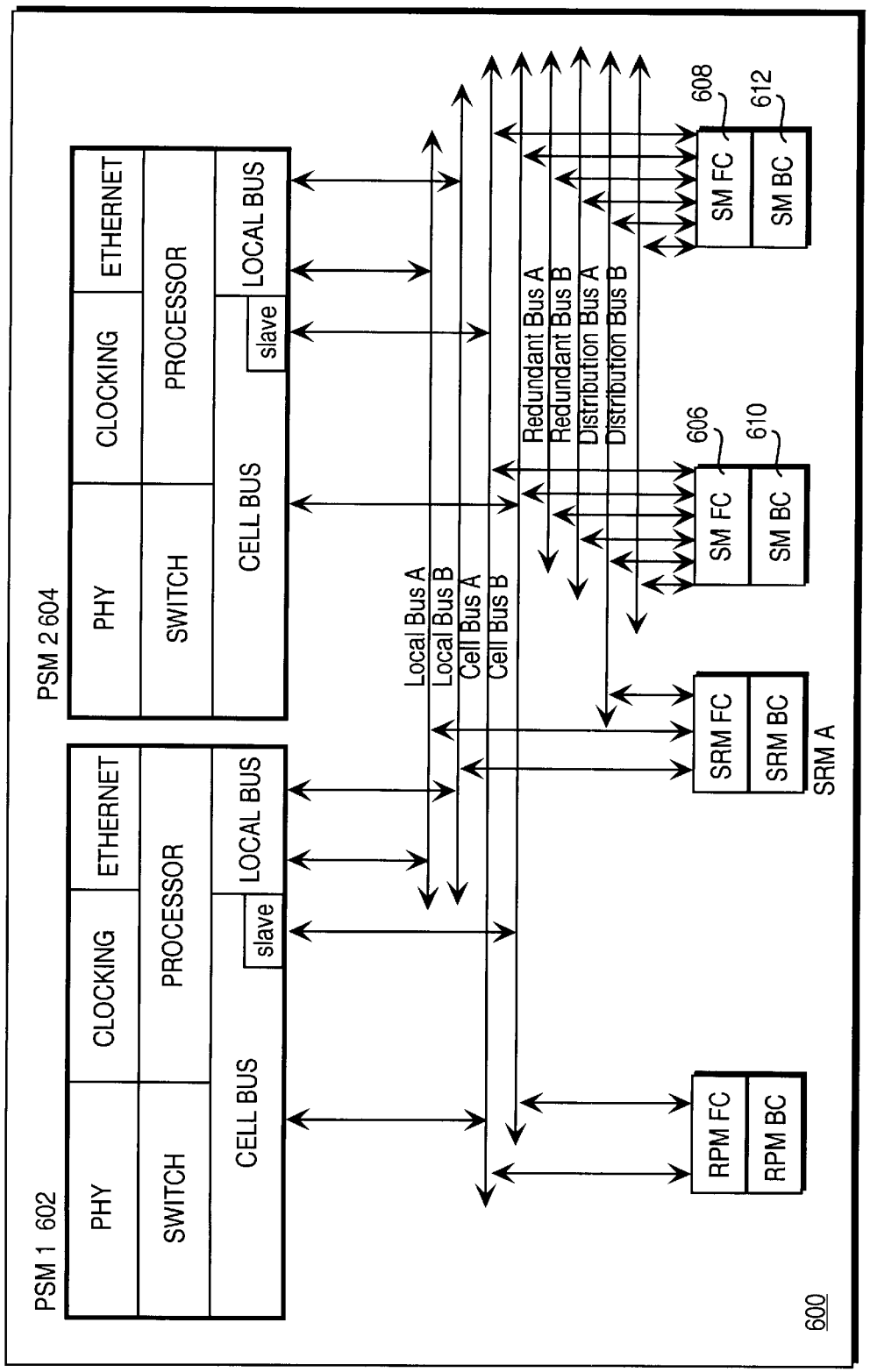
FIG. 6 is a system block diagram of the switch platform of one embodiment.

FIG. 6 is a system block diagram of the switch platform 600 of one embodiment. As previously discussed herein, the switch platform 600 comprises two PSMs 602–604 and sixteen service modules, wherein two service module front cards 606–608 each comprise four service modules and two service module back cards 610–612 each comprise four service modules, but the embodiment is not so limited. The PSMs 602–604 provide, but are not limited to, the following functions: switch fabric; processor; cell bus interface to service modules; clocking; ethernet and RS232 ports; and system environment monitoring. The PSMs 602–604 provide a shared memory switch fabric capable of sustaining two times OC12 bandwidth. Furthermore, the PSMs 602–604 provide the switch platform 600 control functions and a switch fabric for intra-nodal cell switching. Moreover, the PSMs 602–604 provide a variety of interfaces for satisfying trunk requirements. In one embodiment, the system bandwidth may be increased by changing the PSM, thereby allowing for the use of multiple high bandwidth service modules.

The service modules of one embodiment support services including, but not limited to, Internet Protocol (IP), frame relay (FR), circuit emulation, and ATM. The narrow band interfaces, or service modules, supported in one embodiment comprise, but are not limited to, eight port channelized and unchannelized T1/E1 frame relay service modules, eight port T1/E1 ATM service modules, and four port circuit emulation. Furthermore, supported service modules comprise eight port CO-FRAD, eight port T1/E1 circuit emulation, T3/E3 circuit emulation, two port 16M HSSI FR, two port DS1 and DS0 channelized DS3 FR, two port DS3 unchannelized DS3 FR, two port 52M HSSI FR, ATM service modules, and voice card service modules. Moreover, broadband interfaces, or service modules, are supported.

In one embodiment, each PSM supports 128 k cell storage within the switch, but the embodiment is not so limited. In one embodiment, the total bandwidth on the switch is more than two OC12, wherein the bandwidth is partitioned for local switching and for trunk switching. Local switching refers to switching between service modules of a switch platform while trunk switching refers to switching between a PSM trunk and either the service modules or the PSM trunk. Alternate embodiments may support an aggregate of 24 Gbps bandwidth.

Eight cell buses are supported by each PSM of one embodiment. Each cell bus is capable of sustaining one OC3 bidirectional bus; however, the PSM may support a two times clock mode providing more than OC6 capacity. The cell buses provide a high speed interface between the switch fabric and the service modules using a Cell Bus Controller ASIC (CBC ASIC or CBC). The CBC interfaces with the eight OC3 cell bus lanes provided by the PSM. To facilitate communication between PSMs, a cell bus slave is added to each PSM. In one embodiment, the cell bus slave on a first PSM of the switch platform is coupled to one of the cell buses driven by a second PSM of the switch platform. Therefore, a PSM may send a cell back to itself through the switch. In one embodiment, the local switching function supports 16K bi-directional connections, and the trunk switching function supports 32K bi-directional connections, but the embodiment is not so limited.

The cell bus of one embodiment comprises a number of buses that provide inter-connectivity and redundancy to the switch modules. In particular, the cell bus provides a high speed cell data path between the service modules and the PSM switch fabric. The cell bus comprises a collection of independently controlled bus lanes. Each of the bus lanes, or sub-cell buses, provides up to two OC3 bandwidth, wherein a total of four cell bus lanes are provided for each sub-shelf. The four cell bus lanes, where each is capable of supporting one OC3 bandwidth, allows the embodiment to sustain two times OC12 bandwidth. Furthermore, two sets of cell bus lanes are provided for supporting service module redundancy.

The switch platform software of one embodiment comprises several software subsystems distributed across the PSM and the service modules. The software subsystems are separated into three layers: node management software; network control software; and platform control software. Subsystems in each of these layers are separated by application programmer interfaces (APIs). A virtual switch interface (VSI) serves as a standardized interface on the switch thereby allowing one controller implementation to be used across different platforms for the same function. The switch platform of one embodiment supports VSI slaves for PNNI, AutoRoute, and tag switching. Within a switch platform, VSI-related functions are performed by one or more processors known as VSI slaves. The VSI slaves may be organized using a centralized model, a distributed model and a hybrid model; each of these models may be supported by the platform of one embodiment, but the embodiment is not so limited.

Figure 7:
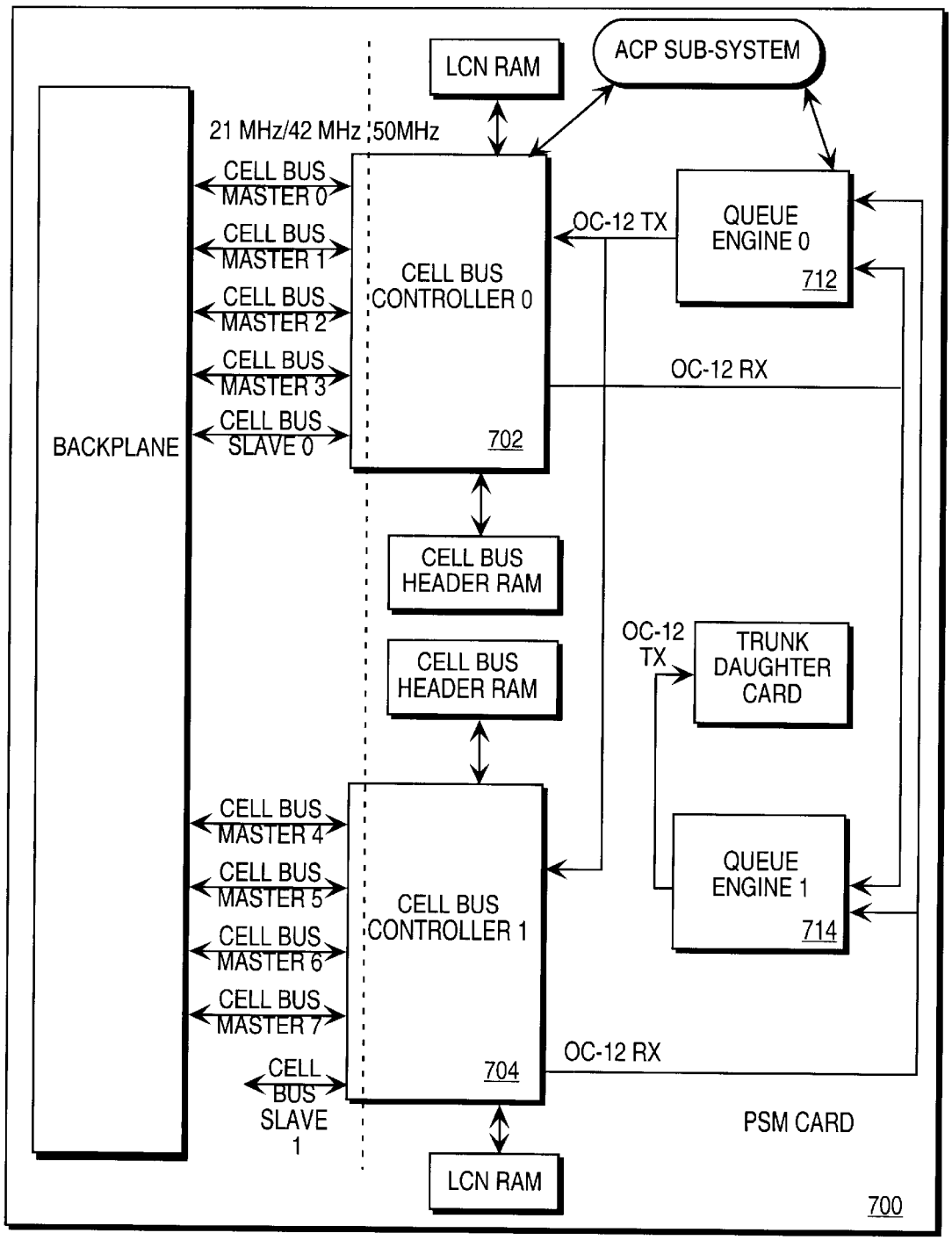
FIG. 7 is a PSM comprising Cell Bus Controllers (CBCs) of one embodiment.

FIG. 7 is a PSM 700 comprising Cell Bus Controllers (CBCs) 702–704 of one embodiment. Each CBC 702–704 controls cell traffic between four Cell Bus Masters (CBMs) CBM0-CBM7, one Cell Bus Slave (CBS) CBS0-CBS1, and two Queue Engine ASICs (QE ASIC or QE) 712–714, but the embodiment is not so limited. It is noted that, as used herein, the term "ingress" is used to refer to cell traffic flow toward the switch 712–714, or QE, and the term "egress" is used to refer to cell traffic flow away from the switch 712–714. Thus, the cell traffic flow from the QE 712–714 to the CBC 702–704 is termed egress, and the cell traffic flow from the CBC 702–704 to the QE 712–714 is termed ingress. The CBC 702–704, in acting as a master to four cell buses and a slave to one cell bus, controls cell traffic between the five cell buses and the two QEs 712–714. A CBC interface couples the CBCs 702–704 and the QEs 712–714. In one embodiment, a CBC can handle 32 devices on the CBC interface, but the embodiment is not so limited.

The CBC of one embodiment supports one OC-12 (622 Mbit/s) cell input/output (I/O) bandwidth, meaning that the CBC can read/write a cell from/to the QE within approximately 680 nanoseconds, but the embodiment is not so limited. Each CBM supports an OC-3 bandwidth for transmitting and receiving. The CBC of one embodiment may implement cell storage using first-in-first-out (FIFO) buffers along the cell datapath. The CBC is used twice in the QE mode in each PSM card. Each CBC receives cells over a bus from one QE but sends cells over the bus to both QEs. On egress, the CBC routes traffic to the CBS.

Each CBM of one embodiment comprises clock logic, which can operate at either 21 MHz, 42 MHz, or 50 MHz, and a clock input pin, but the embodiment is not so limited. Moreover, all four CBMs can run synchronously on one common clock. Each CBS of one embodiment handles bus traffic of speeds up to OC-3; therefore, the aggregate bandwidth for the cell buses is more than one OC-12. Each CBS of one embodiment runs on a 21 MHz, 42 MHz, or 50 MHz clock, but the embodiment is not so limited.

Figure 8:
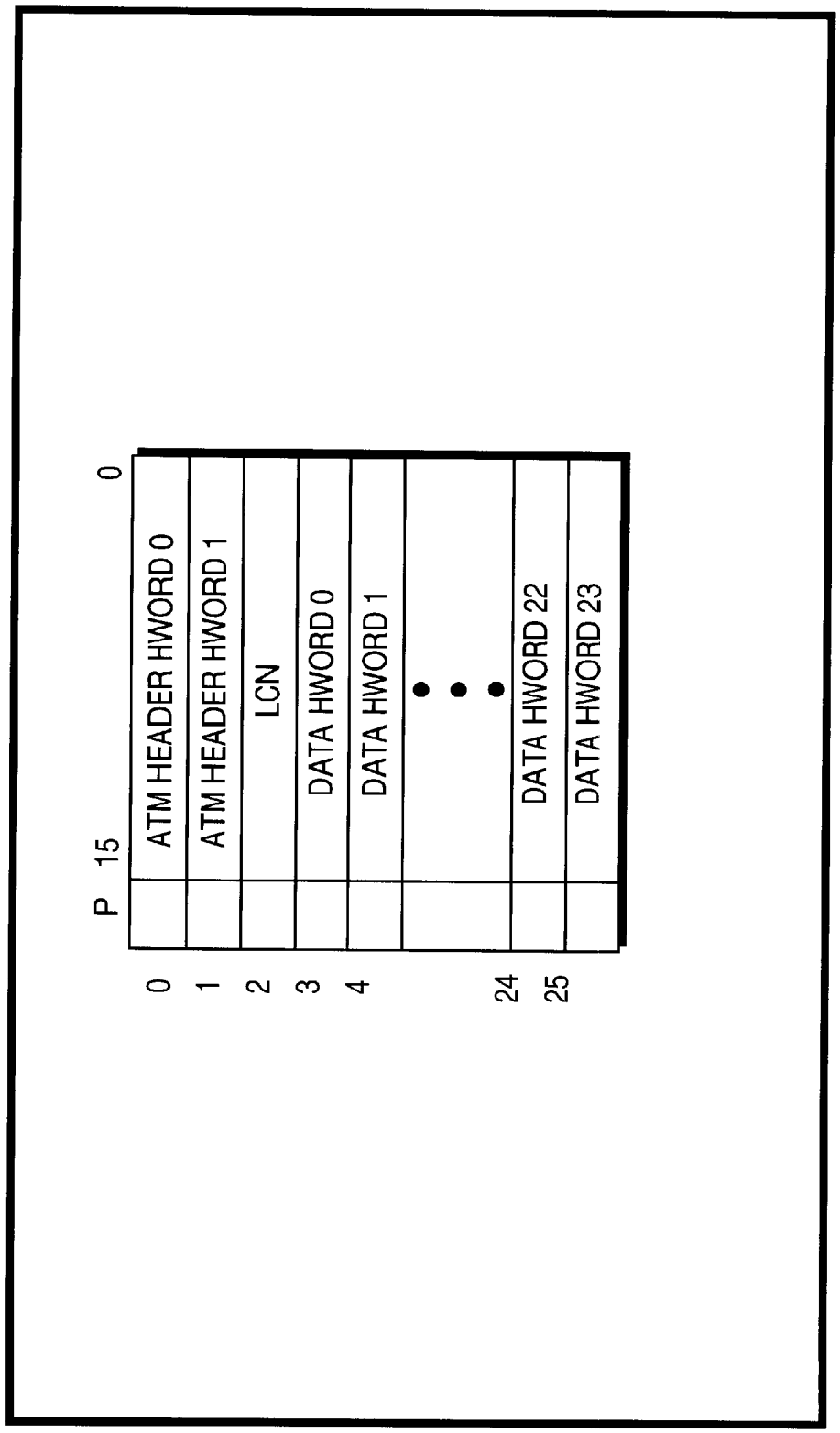
FIG. 8 is a cell format of the QE mode of one embodiment.

The CBC of one embodiment supports two modes, a QE mode and an ATM mode. In supporting the QE mode, the CBC utilizes two transmit and two receive slave ports of the CBC interface. The CBC interface uses a 16-bit data path that transmits cells that each comprise twenty-seven 16-bit words. FIG. 8 is a cell format of the QE mode of one embodiment. The two CBC interface slave ports, which have separate control signals and one common datapath, are used to send cells to the two QEs, where data is sent to only one QE at a time. The transmit slave port is used to receive cells from one QE.

In supporting the ATM mode, one CBC interface receive slave port and one CBC interface transmit slave port are used, but the embodiment is not so limited. The CBC interface comprises an 8-bit datapath that transmits cells that each comprise 56 byte words. FIG. 9 is a cell format of the ATM mode of one embodiment. Egress traffic is routed to the CBS in the ATM mode.

Figure 10:
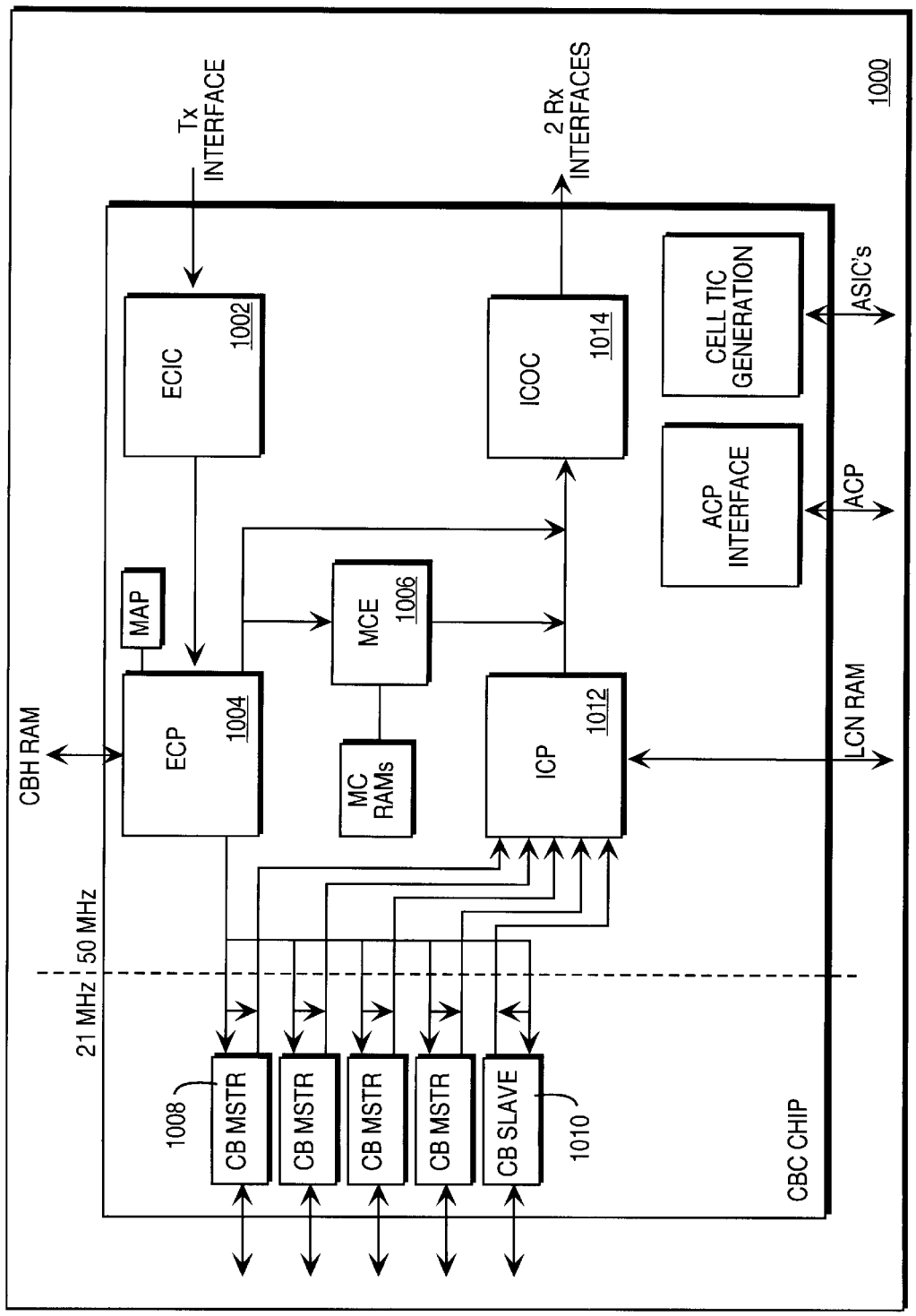
FIG. 10 is a block diagram of a Cell Bus Controller (CBC) of one embodiment.
Figure 11:
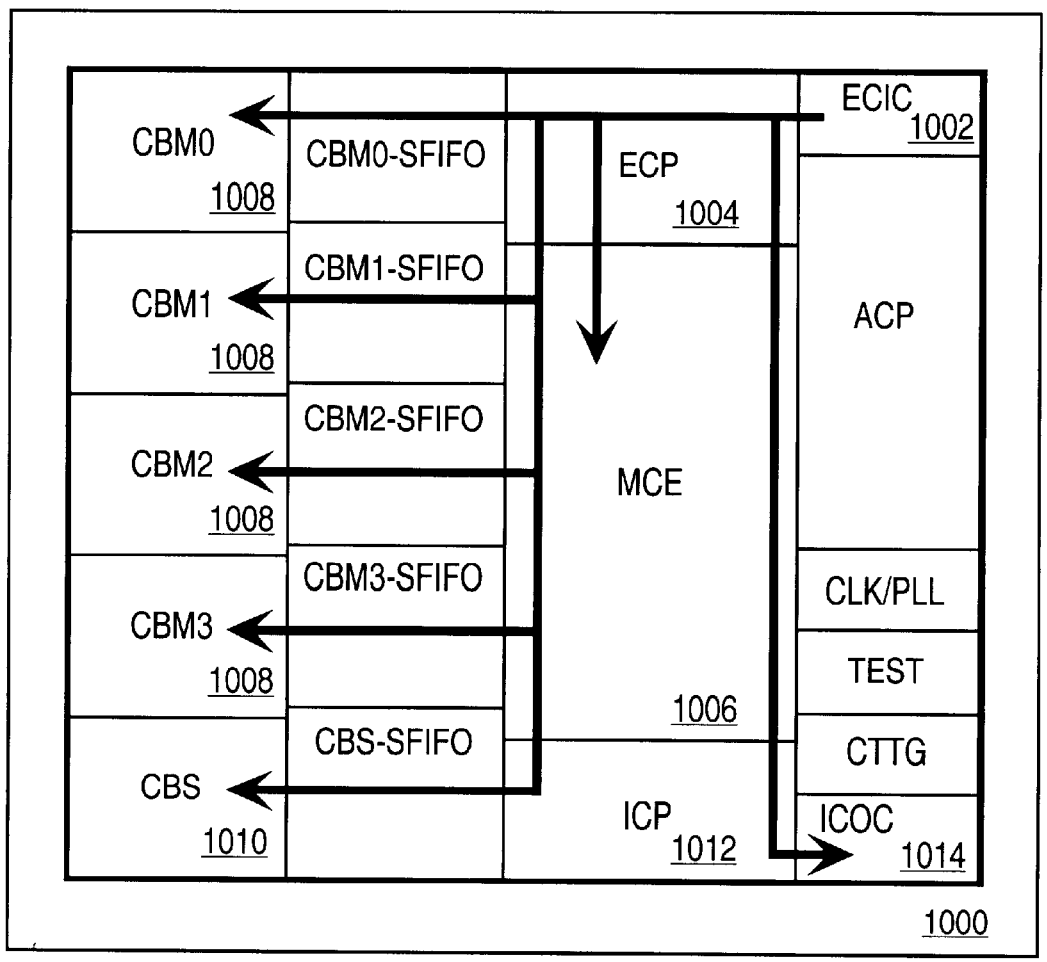
FIG. 11 is a diagram of an egress data flow of a CBC of one embodiment.
Figure 12:
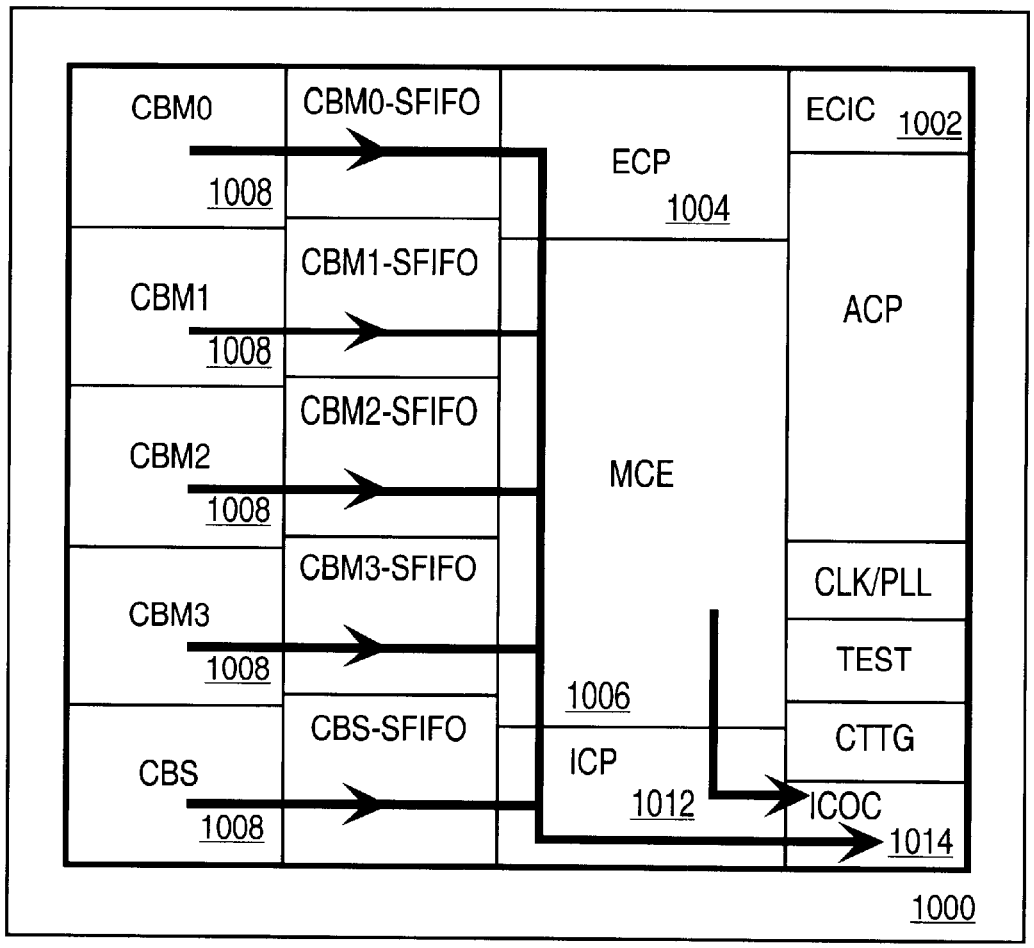
FIG. 12 is a diagram of an ingress data flow of a CBC of one embodiment.

FIG. 10 is a block diagram of a Cell Bus Controller (CBC) 1000 of one embodiment. FIG. 11 is a diagram of an egress data flow of a CBC 1000 of one embodiment. FIG. 12 is a diagram of an ingress data flow of a CBC 1000 of one embodiment. The CBC 1000 comprises, but is not limited to, an Egress Cell Input Controller (ECIC) 1002, an Egress Cell Processor (ECP) 1004, a Multicast Engine (MCE) 1006, a CBM 1008, a CBS 1010, an Ingress Cell Processor (ICP) 1012, and an Ingress Cell Output Controller (ICOC) 1014.

Figure 13:
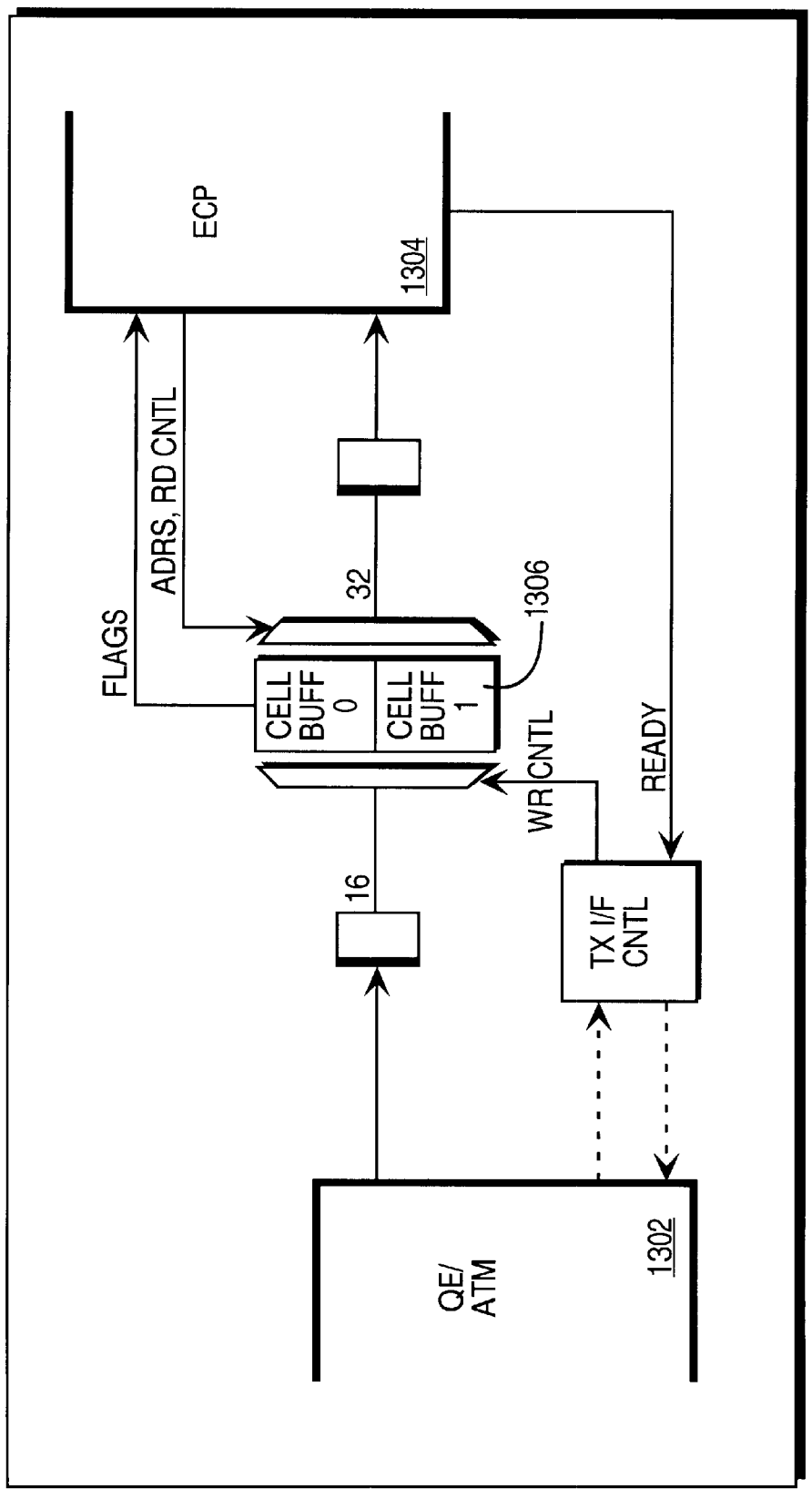
FIG. 13 is a block diagram of an Egress Cell Input Controller (ECIC) of one embodiment.

FIG. 13 is a block diagram of an Egress Cell Input Controller (ECIC) of one embodiment. In operation the ECIC receives cells from one QE 1302, using the cell bus transmit slave interface. As such, the ECIC is the first module of one embodiment through which incoming cells pass on the egress datapath of the CBC. The primary interfaces of the ECIC are with the QE or ATM 1302 and the ECP 1304. The ECIC is responsible for interfacing with the QE/ATM 1302 over a cell bus interface, wherein the QE/ATM 1302 is the cell bus transmit master and the ECIC is the cell bus transmit slave. Furthermore, the ECIC stores ATM cells sent by the QE 1302 in a two-cell deep FIFO 1306, and provides ATM cell availability status to the ECP 1304. Moreover, the ECIC converts the 16-bit input datapath in the QE mode, or the 8-bit input datapath in the ATM mode, to a 32-bit internal datapath.

Figure 14:
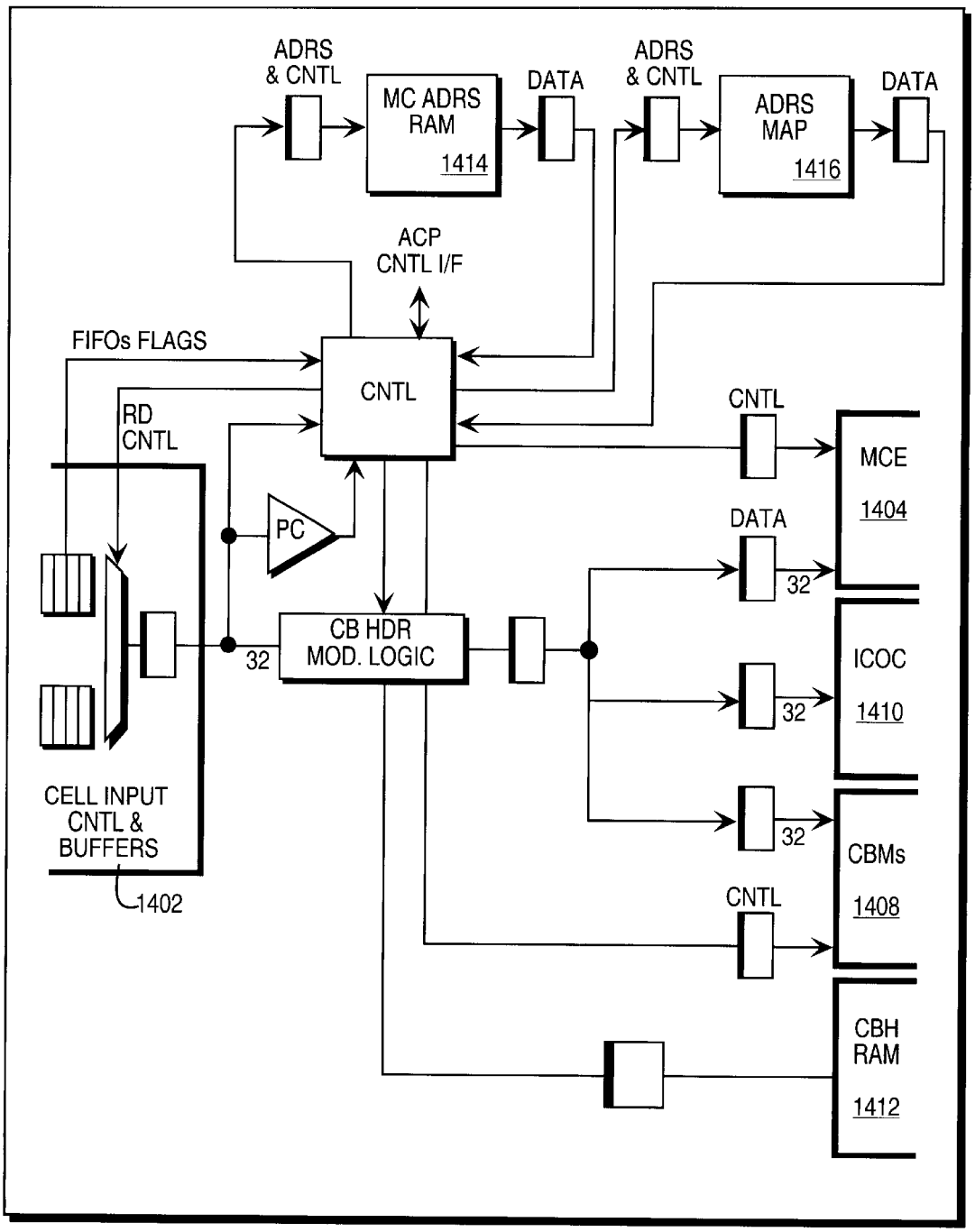
FIG. 14 is a block diagram of an Egress Cell Processor (ECP) of one embodiment.

FIG. 14 is a block diagram of an Egress Cell Processor (ECP) of one embodiment. The ECP is the second module of one embodiment through which incoming cells pass on the egress datapath of the CBC. The primary interfaces of the ECP are with the ECIC 1402, the MCE 1404, the CBS, four CBMs 1408, and the ICOC 1410. The ECP processes cells received from the QE via the ECIC 1402 and forwards the cells to one of four CBMs 1408, a CBS, or an MCE 1404. Processing includes Cell Bus Header look-up from the Cell Bus Header RAM 1412 for cell bus traffic and Multicast (MC) Address RAM 1414 lookup for multicast traffic. For ATM traffic, the ECP simply forwards the cell to the CBS, without the Cell Bus Header look-up. The ECP unloads cells from the ECIC input FIFOs and checks the parity of the data read from these FIFOs.

The ECP performs cell bus interface polling address to target address mapping using thirty-two possible polling address destinations that are mapped to twenty-six targets. The mapping is performed by Address Map RAM 1416 look-up logic, wherein the targets are the service modules via a CBM, a second PSM Card via a CBS, and a MCE.

For cell bus cells in the QE mode of one embodiment, the ECP generates a Cell Bus Header (CBH) random access memory (RAM) address for the cells using a logical connection number (LCN), accesses the CBH RAM for the CBH entry, and generates a new Logical Slot ID in the CBH, wherein the physical slot ID is found in the Address Map RAM. Furthermore, the ECP adds the CBH to the cells and sends the cells to one of the CBMs or the CBS, depending on the address. If the number of cells in the egress FIFO of the target reaches a threshold, the ECP discards the incoming cell. The threshold is defined as the maximum number of cells in the FIFO, 8 cells in one embodiment, with a 2-bit threshold configuration subtracted, but the embodiment is not so limited.

For MC cells in the QE mode of one embodiment, the ECP uses the upper twelve bits of the LCN to perform Multicast Address Look-up. The ECP replaces the first UDF in the cell with the MC Record RAM Address and sends the cells to the MCE. If a back pressure signal from the MCE is active, the cell is discarded by the ECP.

In the ATM mode of one embodiment, cells are routed to the CBS without any processing, except for a parity check. When a loopback control is active, all traffic is routed to the ICOC. When the cell available signal from the ICOC is inactive, the cell is discarded. Any parity error in the cell header will cause the cell to be discarded, while any parity error in the payload will set an error flag but will not cause the cell to be discarded.

Figure 15:
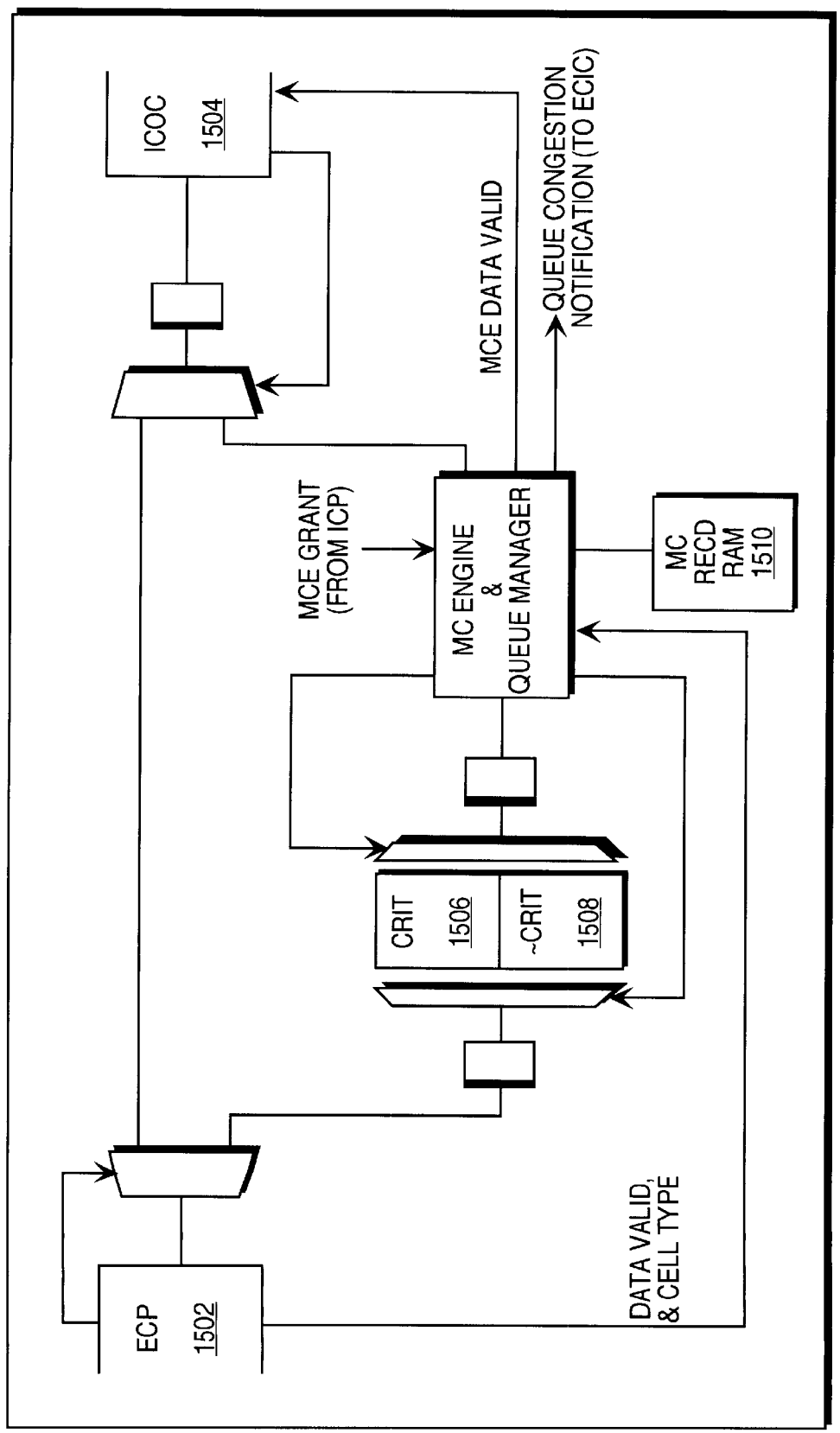
FIG. 15 is a block diagram of a Multicast Engine (MCE) of one embodiment.

FIG. 15 is a block diagram of a Multicast Engine block (MCE) of one embodiment. The MCE and the associated queues comprise the third module through which MC cells pass on the egress datapath of the CBC. The primary interfaces of the MCE are with the ECP 1502, the ICP, and the ICOC 1504. The MCE is responsible for storing MC cells in either the critical 1506 or the non-critical queue 1508, replicating and sending MC cells for each LCN in a given MC Group at a rate of up OC-12 to the ICOC 1504. The MCE sends cells to the ICOC 1504 when the ICP has no cells to send. The MCE provides queue storage for thirty-two cells, of which sixteen are critical cells and sixteen are non-critical cells. The MCE replicates MC cells for each LCN associated with that PSM card in a given MC Group at a rate of up to OC-12, and inserts a 5-bit target slot ID, read from a MC record RAM 1510, into the fourth word of the cell. The MCE sends replicated cells to the ICOC 1504 when datapath grants are given by the ICP, and generates back pressure to the ECP 1502 when either of the critical 1506 or non-critical queues 1508 reach a threshold that is configured by firmware.

Figure 16:
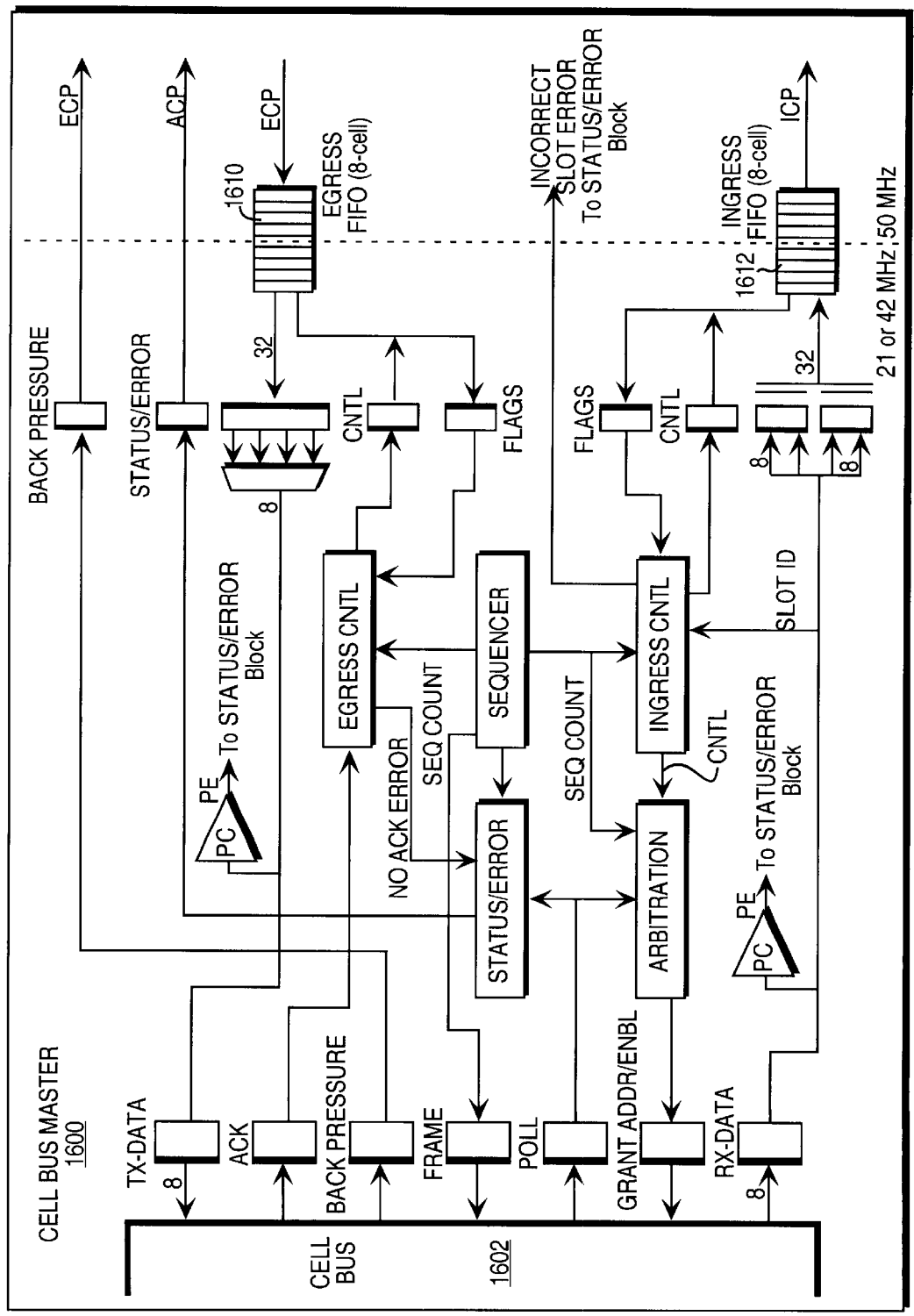
FIG. 16 is a block diagram of a Cell Bus Master (CBM) of one embodiment.

FIG. 16 is a block diagram of a Cell Bus Master (CBM) 1600 of one embodiment. The CBM 1600 interfaces with the cell bus 1602 as a master; as such, the CBM 1600 handles cell traffic in both ingress and egress directions.

The CBM 1600 is used four times in the CBC of one embodiment, but the embodiment is not so limited.

The CBM 1600 and associated FIFOs 1610–1612 are used to handle both ingress and egress cell bus traffic. During data ingress, the CBM 1600 arbitrates requests from service modules on the cell bus 1602 and grants one service module the right to send a cell in the next cell time. In arbitrating, the CBM 1600 provides polling and bandwidth specific arbitration logic to determine which service module can send cells to the CBM 1600. The CBM grant logic grants CBM access to the service module selected so the service module can send a cell to the CBM 1600. In supporting data ingress, the CBM 1600 provides a dedicated eight-cell ingress FIFO 1612 for storing a maximum of eight cell bus cells, but the embodiment is not so limited. The CBM 1600 interfaces with the ICP via the CBM ingress FIFO 1612; the CBM 1600 writes to the ingress FIFO 1612 while the ICP reads from the FIFO 1612 and processes the read cell. The CBM 1600 checks parity over each 8-bit word as the word is read from the cell bus 1602, converts the received cell to a 32-bit word, and writes the 32-bit word into the ingress FIFO 1612. Moreover, the CBM 1600 checks the slot ID of the cell received against the slot ID of the service module that was granted access to the CBM 1600 in order to verify that the correct service module is sending the cell. The CBM 1600 polls for status comprising back pressure, ready, and present status, but the embodiment is not so limited.

During data egress, the CBM 1600 provides a dedicated 8-cell egress FIFO 1610 for storing a maximum of eight cell bus cells. The ECP writes to the FIFO 1610 while the CBM 1600 reads from the FIFO 1610. The CBM 1600 reads 32-bit words from the egress FIFO 1610 and checks parity over each of the two 16-bit words read. The CBM 1600 converts each 16-bit word to two 8-bit words and generates parity. Each 8-bit word and the corresponding parity is provided to the cell bus 1602. As the read cell is transmitted to all service modules on the cell bus 1602, each service module will read in the cell and determine if the cell is destined for that service module by looking at the broadcast field and the slot ID field in the Cell Bus Header. The CBM 1600 checks to make sure a service module acknowledges receipt of the transmitted cell. The CBM 1600 has the capability to reset each service module.

Figure 17:
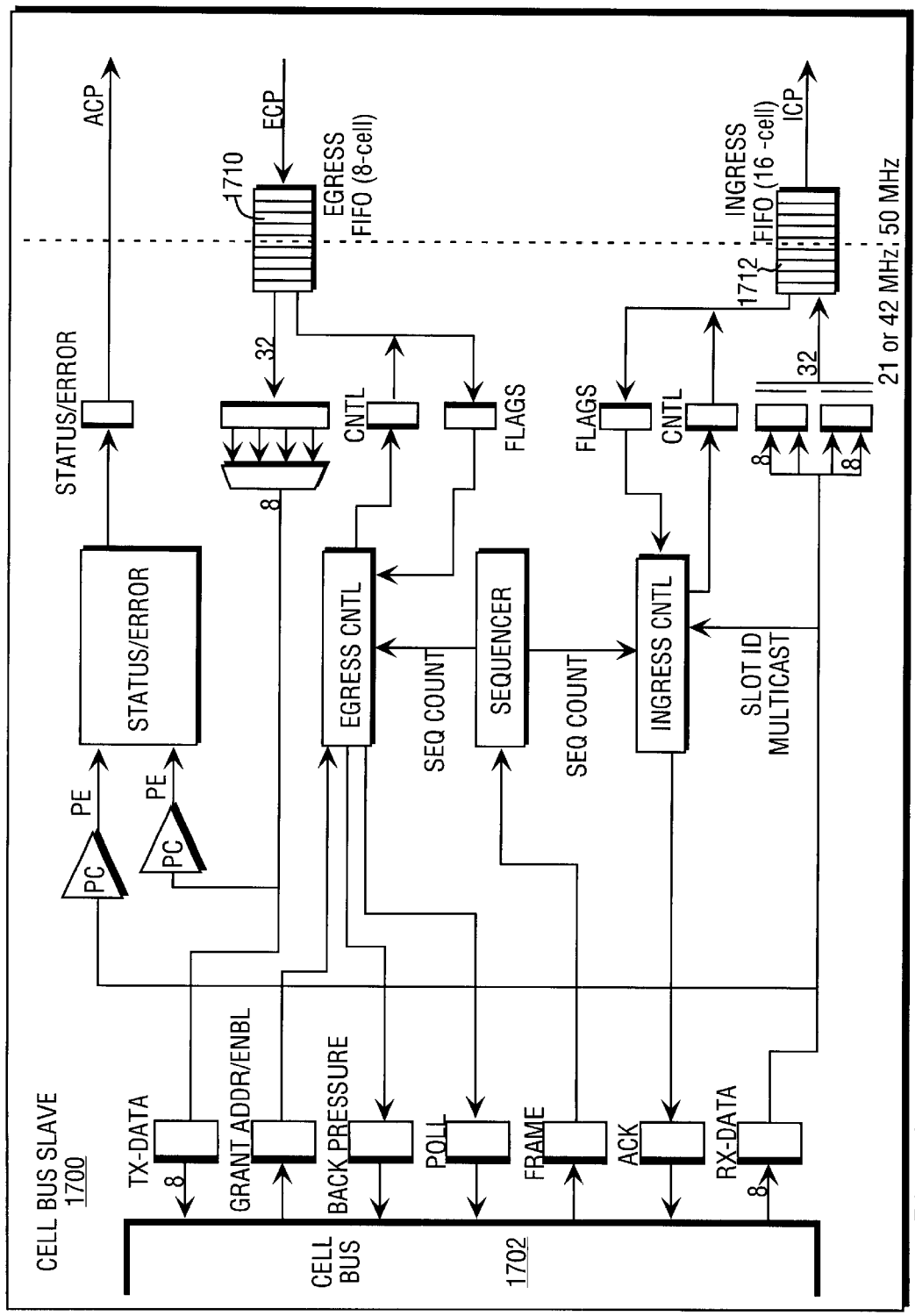
FIG. 17 is a block diagram of a Cell Bus Slave (CBS) of one embodiment.

FIG. 17 is a block diagram of a Cell Bus Slave (CBS) 1700 of one embodiment. The CBS 1700 interfaces with the cell bus 1702 as a slave, wherein the CBS 1700 and associated FIFOs 1710–1712 are used to handle both ingress and egress cell bus traffic. The CBS 1700 interfaces with the ECP and the ICOC. On ingress, the CBS 1700 receives cells from the cell bus 1702, wherein the CBS 1700 provides a dedicated 16-cell ingress FIFO 1712 for storing a maximum of 16 cell bus cells. The CBS 1700 writes to the FIFO 1712 while the ICP reads from the FIFO 1712. Furthermore, the CBS 1700 checks parity over each 8-bit word as the word is read from the cell bus 1702. The CBS 1700 checks the Slot ID and the MC bit in the Cell Bus Header of the cell received against the Slot ID of the CBS 1700 and accepts the cell if the Slot ID matches or the MC bit is asserted; otherwise, the cell is discarded. As a cell is received, the cell is converted to a 32-bit word before being written into the ingress FIFO 1712. An acknowledge signal is sent to the transmitting CBM after the cell is received. The accepted cell is written to the CBS ingress FIFO 1712. The ICP reads the cell from the ingress FIFO 1712 and processes the cell.

On egress, the CBS 1700 is responsible for providing a dedicated 8-cell egress FIFO 1710 for storing a maximum of eight cell bus cells. The ECP writes to the egress FIFO 1710 while the CBS 1700 reads from the egress FIFO 1710. The CBS 1700 converts a 32-bit word read from the egress FIFO 1710 to two 16-bit words, and checks parity over each 16-bit word. The CBS 1700 makes a request to an associated CBM during a poll phase to send a cell to the cell bus 1702, and waits for a grant. If a grant is received, the CBS 1700 sends the cell to the cell bus 1702 and the CBM. Furthermore, the CBS 1700 generates ready, present, and back pressure status. Moreover, on egress the CBS 1700 provides the capability to loopback egress cell traffic, wherein the loopback provides cell traffic to ingress for diagnostic individual cell bus loopback. FIG. 18 shows the CBM cell bus signal timing of one embodiment. FIG. 19 shows the CBS cell bus signal timing of one embodiment.

Figure 20:
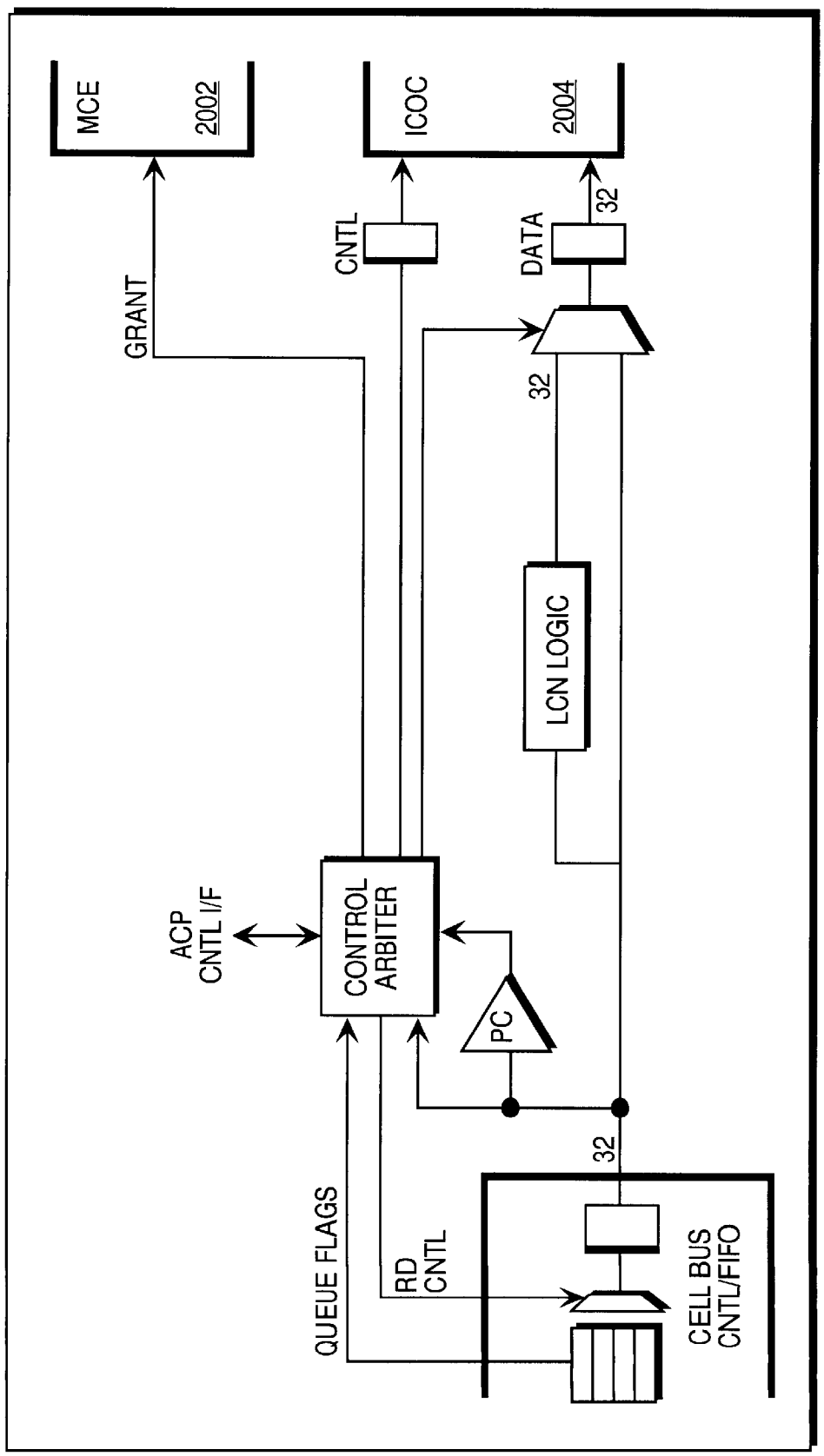
FIG. 20 is a block diagram of an Ingress Cell Processor (ICP) of one embodiment.

FIG. 20 is a block diagram of an Ingress Cell Processor (ICP) of one embodiment. The ICP is the second module through which incoming cell bus cells pass on the ingress datapath of the CBC. The primary interfaces of the ICP comprise the four CBMs, the CBS, the ICOC 2004, and the MCE 2002. The ICP is responsible for determining service decisions by arbitrating between four CBMs and one CBS. Once the service decision is determined, a cell is then read from the FIFO of the selected source and processed. If the CBC is in the QE mode, the ICP will do a look-up in the external LCN RAM for the LCN and insert it into the cell. No processing is done in the ATM mode of one embodiment, but the embodiment is not so limited. An ACP, or processor, can manipulate the priority of CBS traffic by setting a 6-bit CBS priority configuration. The ICP unloads cell bus cells from the ingress cell bus FIFO of the selected source, and checks parity over the data read from the input FIFO.

In the QE mode, the ICP removes the Cell Bus Headers from the cell bus cells and forms a new cell. The ICP generates LCN RAM addresses, looks up LCNs in the external LCN RAM using the generated address, inserts the new LCN in the new cell, extracts the target slot ID from the Cell Bus Header and inserts it into the new cell, and transmits the generated new cells to the ICOC.

In the ATM mode, the ICP transfers the cell to the ICOC after a parity check. When there is no cell to send in a cell time, the ICP grants the MCE the cell time so the MCE can send the cell to the ICOC.

Figure 21:
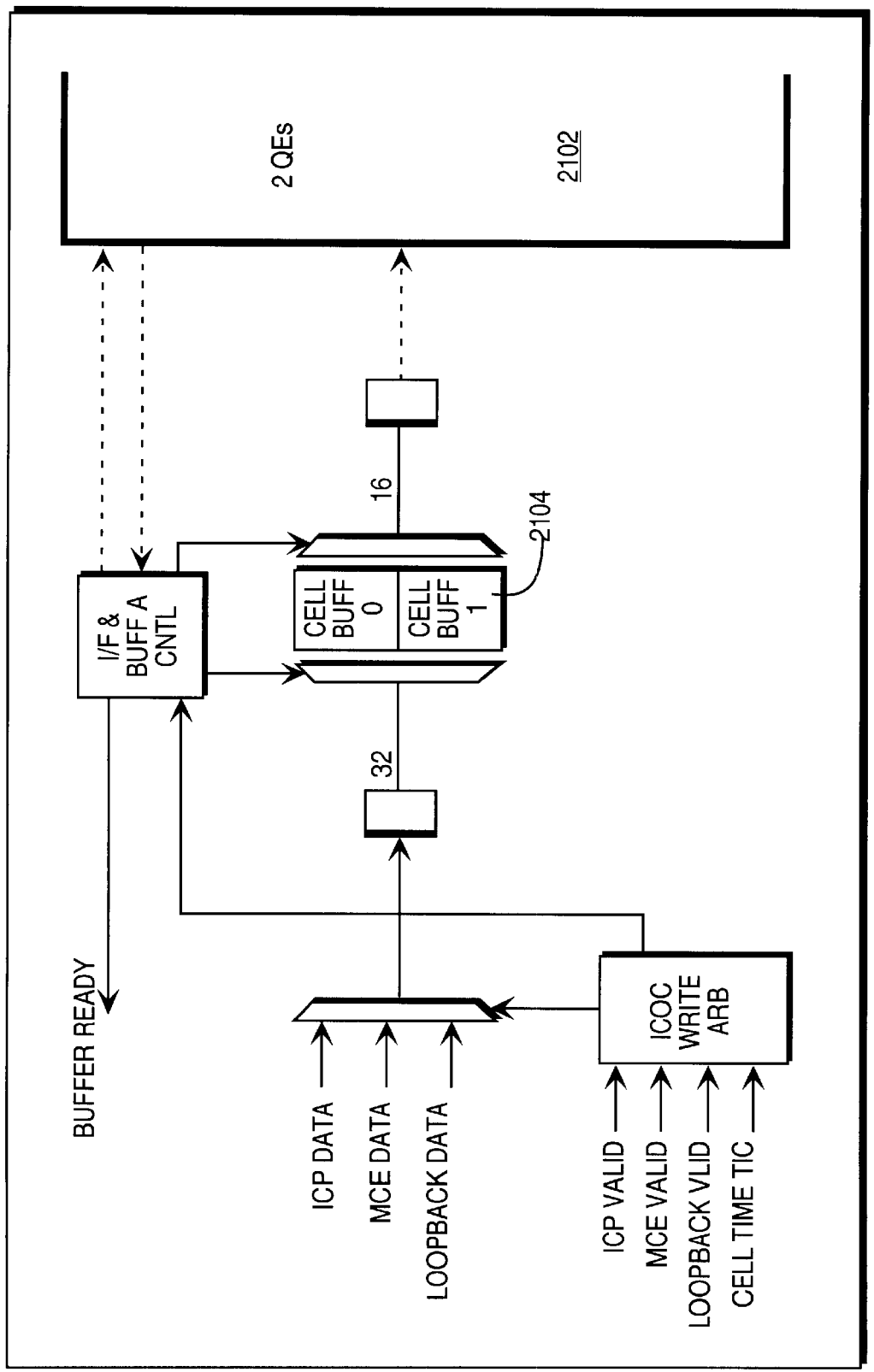
FIG. 21 is a block diagram of an Ingress Cell Output Controller (ICOC) of one embodiment.

FIG. 21 is a block diagram of an Ingress Cell Output Controller (ICOC) of one embodiment. The ICOC is the last module through which ATM cells pass on the ingress datapath of the CBC, but the embodiment is not so limited. The primary ICOC interfaces comprise the interfaces with the ICP module, the ECP module, the MCE module, and the QE 2102 or ATM. The ICOC determines the QE destination from the target slot ID and sends cells to that QE using the cell bus receive slave interface.

The ICOC stores ATM frames sent by the MCE, the ICP, or the ECP into the two-cell FIFO 2104. The ICOC interfaces with the ingress QE/ATM 2102 over a cell bus interface. Furthermore, the ICOC converts the 32-bit internal datapath to a 16-bit interface datapath in the QE mode, and to an 8-bit interface path in the ATM mode.

An ACP interface and control logic is responsible for handling ACP requests to the CBC. The primary interfaces of the ACP interface and control logic are with the external ACP sub-system and the CBC internal modules. The ACP interface and control module is responsible for monitoring the ACP interface and looking for valid CBC requests from the ACP. The ACP interface and control module maintains various control and status registers, and provides configuration information to the CBC. Furthermore, the ACP interface and control module performs ACP-requested actions and passes the required information to the appropriate module so that it can complete the operation.

Cell bus logic controls cell bus cell flow to and from the five external cell buses of one embodiment. The cell bus logic is implemented in the CBM and the CBS. Each of the four CBMs of one embodiment control an associated cell bus. The CBS can interface with one of the four cell buses controlled by the four CBMs or it can communicate with a dedicated cell bus. In the PSM, the CBS communicates over a dedicated cell bus. Furthermore, the CBS is connected to the cell bus which is controlled by a CBM in another PSM card; this is how the two PSMs communicate with each other.

When the CBM grants a slave module request to send a cell to the requesting slave module during the next cell time, it presents the grant address and asserts a grant enable bit from cell bus cycle 51 to cycle 58. When the slave receives its Physical Slot ID on the grant bus along with the asserted grant enable signal any time during the grant cycle, the slave is enabled to transmit a cell onto the bus during the next cell time.

In the operation of a slave module sending data to a CBM, when the slave module which has made a request to send a cell to the CBM receives the grant from the CBM, the slave module starts sending the cell at the beginning of the next cell bus frame time following assertion of the Tx-Frame signal at cycle 1. The first byte of the cell is sent to the CBM at cycle 1, while the last byte of the cell is sent at cycle 56.

As the CBM is receiving data from the slave module, the CBM checks to see if the cell is coming from the slave module to which the grant was provided during the last cell bus frame time. If a mis-comparison occurred, an error condition is indicated. The CBM also checks for parity on each byte of the cell as it is received into the CBM.

In the operation of one embodiment of a CBM sending data to slave modules, the first byte of a cell is transmitted in two cycles, cycle 58 and cycle 1. When the CBM is ready to send a cell to the slave module, it will begin sending the cell starting at the last cycle of the current cell bus frame time, cycle 58. The first byte of the cell is sent out again at the first cycle of the next cell bus frame time, cycle 1. The second byte of the cell is sent out in cycle 2, while the last byte of the cell is sent out in cycle 56. In cycle 57, the CBM sends out all zero data. Parity generation is performed on all cell data bytes.

In one embodiment, transmitted cells are sent to all slave modules on the cell bus. Each slave module must read in the first byte of the cell and determine if the cell is addressed to the slave module. As such, the slave module determines whether the physical slot ID field in the first byte of the cell matches the physical slot ID of the slave module receiving the cell, or determines whether the MC bit in the first byte of the cell is a 1. If either of these conditions are satisfied the cell is read and processed; otherwise, the cell is discard.

The slave modules can send three types of status to the CBM, but the embodiment is not so limited. The three types of status are sent using the poll bits like the slave module requests, wherein the poll bits are asserted at different cycles for each different status. The three types of status comprise: a ready status, wherein the slave module is working and ready to interface with the CBM; a present status, wherein the slave module is present but may not be ready; and a stop status, wherein the slave module is congested and cannot accept any more cells from the CBM.

The CBC of one embodiment provides cell bus traffic congestion management between the CBMs and the CBSs of a switch platform. In performing cell traffic congestion management, a CBS determines that it is congested and is running out of buffer space to store the incoming cells. The congested CBS informs, or back-pressures, the corresponding CBM to stop sending cells to the congested CBS. The back-pressure notification uses a back-pressure bit defined in the cell bus interface for each service module on a cell bus. When the back-pressure bit is asserted for a service module, the CBC will prevent the QE from sending cells to that service module. This notification should be sent before the CBS FIFO is full and completely runs out of space to store incoming cells so as to provide time for the CBM to react while providing enough storage space for the cells already in transit to the CBS. Upon receipt of the notification from the CBS, the CBM ceases transmission of cells to the congested CBS. The congested CBS will update the congestion notification to the CBM when the CBS ceases to be congested. The CBM, in turn, continuously monitors the congestion notification and resumes sending cells to the CBS when the CBS ceases to be congested.

In order to provide the traffic management function without adding more signals to the cell bus, the congestion notification is performed using an existing request and status poll signal. When the CBS is congested it will assert a poll signal at cell bus cycle 50, when the CBS is in an odd slot of the cell bus frame, or cycle 56, when the slave is in an even slot of the cell bus frame. In one embodiment, CBS congestion is indicated when the CBS input FIFO has space for less than eight cells, wherein the eight cells handle CBM reaction latency and cells already in transit, but the embodiment is not so limited. Upon receipt of the congestion notification by the CBM, the CBM forwards the congestion notification message to the ECP. As a result, the ECIC blocks cell transmission to the CBC ASIC.

The CBC of one embodiment provides flexibility and performance improvement in the translation of routing information between source and target service modules. In the QE mode the CBC supports CBH look-up in the ingress direction, or cell bus to QE direction, and the egress direction, or QE to cell bus direction. The CBH RAM contains one primary and one alternate CBH for each of the 64K logical connection numbers (LCNs). The logical organization of the RAM is 128K×17, but the embodiment is not so limited.

In operation, cells are routed among service modules by the CBC using a first memory to convert an address having a first format into an address having a second format. In one embodiment, the address having the first format is received in a header of a cell, and the address format comprises a 17-bit cell bus logical connection number of a destination port. The address having the second format is a 16-bit UDF used by a switch of the switch platform. The address having the first format is used to form a third address that is used to access the first memory. The data located at the third address of the first memory is a 16-bit UDF used to address the switch.

A second memory is used to convert an address having the second format into an address having the first format. The address having the second format is used as a fourth address to access the second memory. The data located at the fourth address of the second memory is a 32-bit cell bus header that addresses a destination port. The destination port is at least one service module of the switch platform. The first and second memory comprise an external random access memory, but the embodiment is not so limited.

In one embodiment, each connection of a service module has a 17-bit cell bus LCN comprising a 12-bit LCN, a 4-bit Slot ID, and a cell bus number. As the QE, or the switch, has a 16-bit UDF, a mapping is used to map between the LCN and the UDF. The mapping is used because when a cell is transmitted to the CBM on ingress to be switched by the QE, the 17-bit cell bus LCN is converted to the 16-bit UDF used by the QE. Following switching, when a cell is enroute to the target service module on egress, the 16-bit UDF is converted to the 17-bit cell bus LCN for the target service module. The conversions in both the ingress and the egress direction are performed by the CBC via an external RAM lookup. The CBC uses two external memory structures, the CBH RAM and the LCN RAM.

On cell ingress, the 12-bit cell bus LCN and the 4-bit Slot ID from the cell bus Header of the incoming Cell Bus cell are extracted. Furthermore, the cell bus number, indicating whether the cell is coming from CBM 0, 1, 2, 3, or the CBS, is formed by mapping a 3-bit cell bus source number to a 1-bit cell bus number. This mapping may be programmed by firmware. The 12-bit LCN, 4-bit Slot ID, and the cell bus number are used to form a 17-bit address to access the external LCN RAM. The data from the LCN RAM is the 16-bit UDF and it is forward along with the cell to the QE.

On cell egress, the 16-bit UDF of the incoming QE cell is used as the address for the external CBH RAM. The data of the CBH RAM is a 32-bit CBH. It is added to the cell and sent to the service module.

Figure 22:
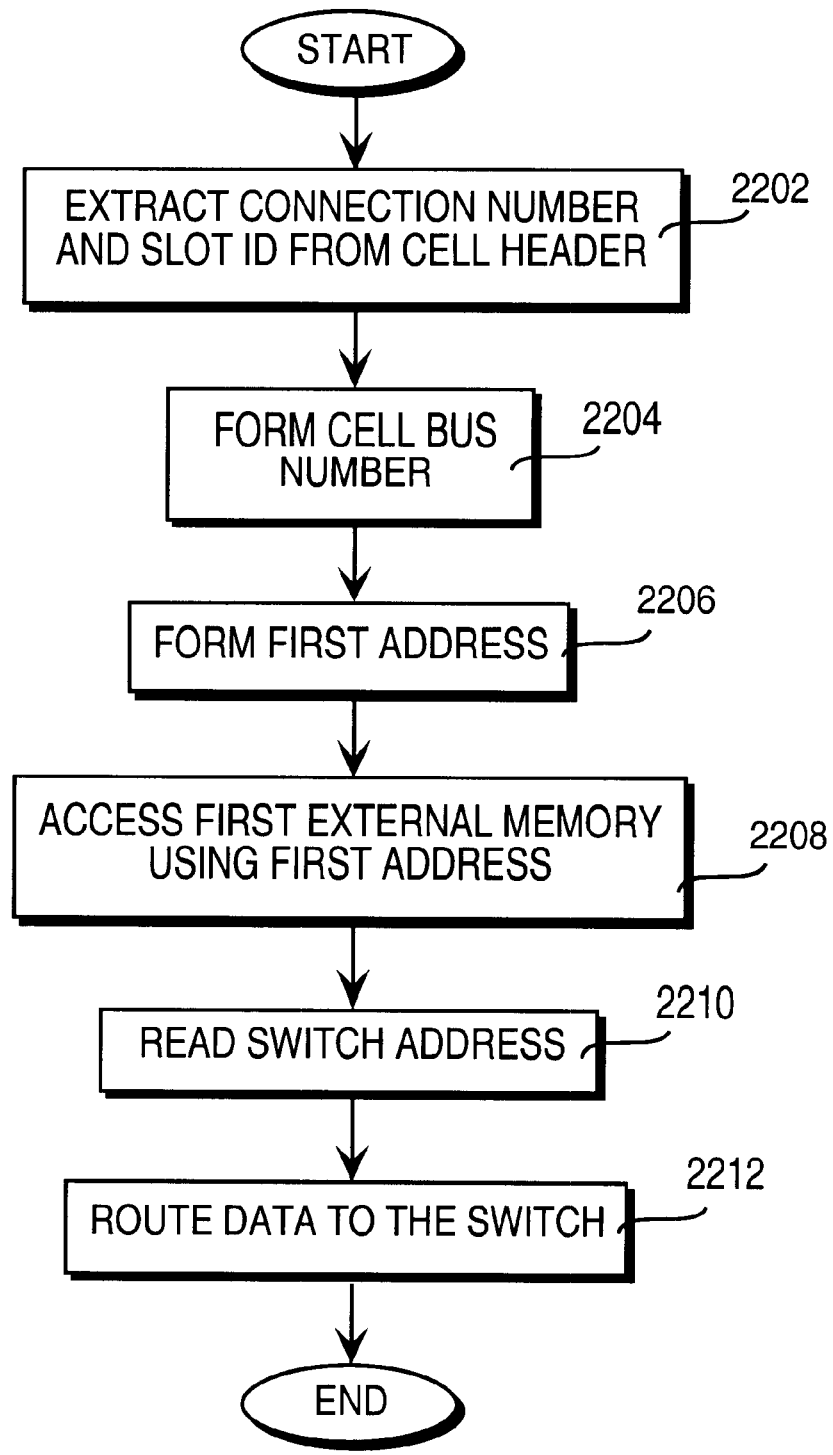
FIG. 22 is a flowchart of a method for routing at least one cell in a switch platform of one embodiment.

FIG. 22 is a flowchart of a method for routing at least one cell in a switch platform of one embodiment. Operation begins at step 2202, at which a logical connection number and a slot identification are extracted from a first cell header of a cell received from at least one service port. A cell bus number is formed, at step 2204, by mapping a cell bus source number of the first cell header. A first address is formed, at step 2206, from the logical connection number, the slot identification, and the cell bus number. The first address may comprise a 17-bit address, but the embodiment is not so limited. A first external memory is accessed using the first address, at step 2208. A 16-bit UDF is read from the first external memory, at step 2210, and the UDF is forwarded to the switch, at step 2212.

Furthermore, a cell may be routed from a switch to a service module, or port, by addressing a second external memory, or CBH RAM, using a 16-bit UDF of at least one cell received from a switch. A second cell header is read from the second external memory, and the second cell header is added to the cell. The second cell header may comprise 32 bits, but the embodiment is not so limited. The second cell along with the second cell header is sent to a destination service port.

The CBC of one embodiment provides 1-to-1 and 1-to-N service module redundancy. Therefore, when any service module in the system fails, a redundant module can be brought on-line to replace the failed module. This redundancy is provided using two CBCs having a total of 128K of Cell Bus Headers and supporting 64K connections. For each connection, there is a primary CBH entry in one CBC, and an alternate CBH entry in the other CBC. The contents are the same but the addresses of these two CBHs are different by one bit, the alternate bit. Each service module has an alternate bit. When a new connection is made, the firmware adds a primary CBH entry to the CBC that currently has the target service module, and adds an alternate CBH entry to the other CBC; this is done to make sure CBH information is on both CBCs. The firmware chooses which of the two CBH entries to use by setting the alternate bit in the Address Map RAM.

Figure 23:
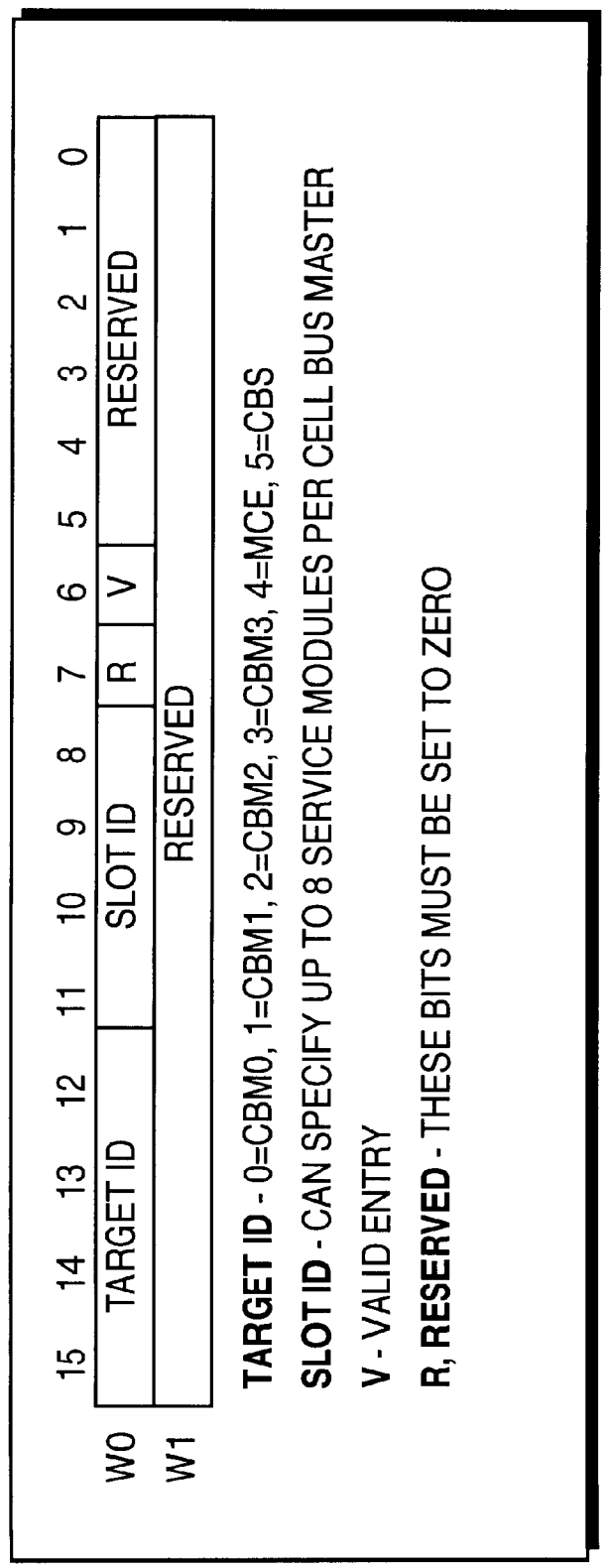
FIG. 23 is an address map RAM data field definition of a CBC of one embodiment.

FIG. 23 is an address map RAM data field definition of the CBC of one embodiment. Up to two PSM cards are supported in two slots of a switch, but the embodiment is not so limited. A set of mappings is defined and, based on the mappings, the firmware programs an Address Map RAM and the Cell Bus Master Configuration Registers. FIG. 24 is a mapping for a first PSM card in a first slot of one embodiment. FIG. 25 is a mapping for a second PSM card in a second slot of one embodiment.

Figure 26:
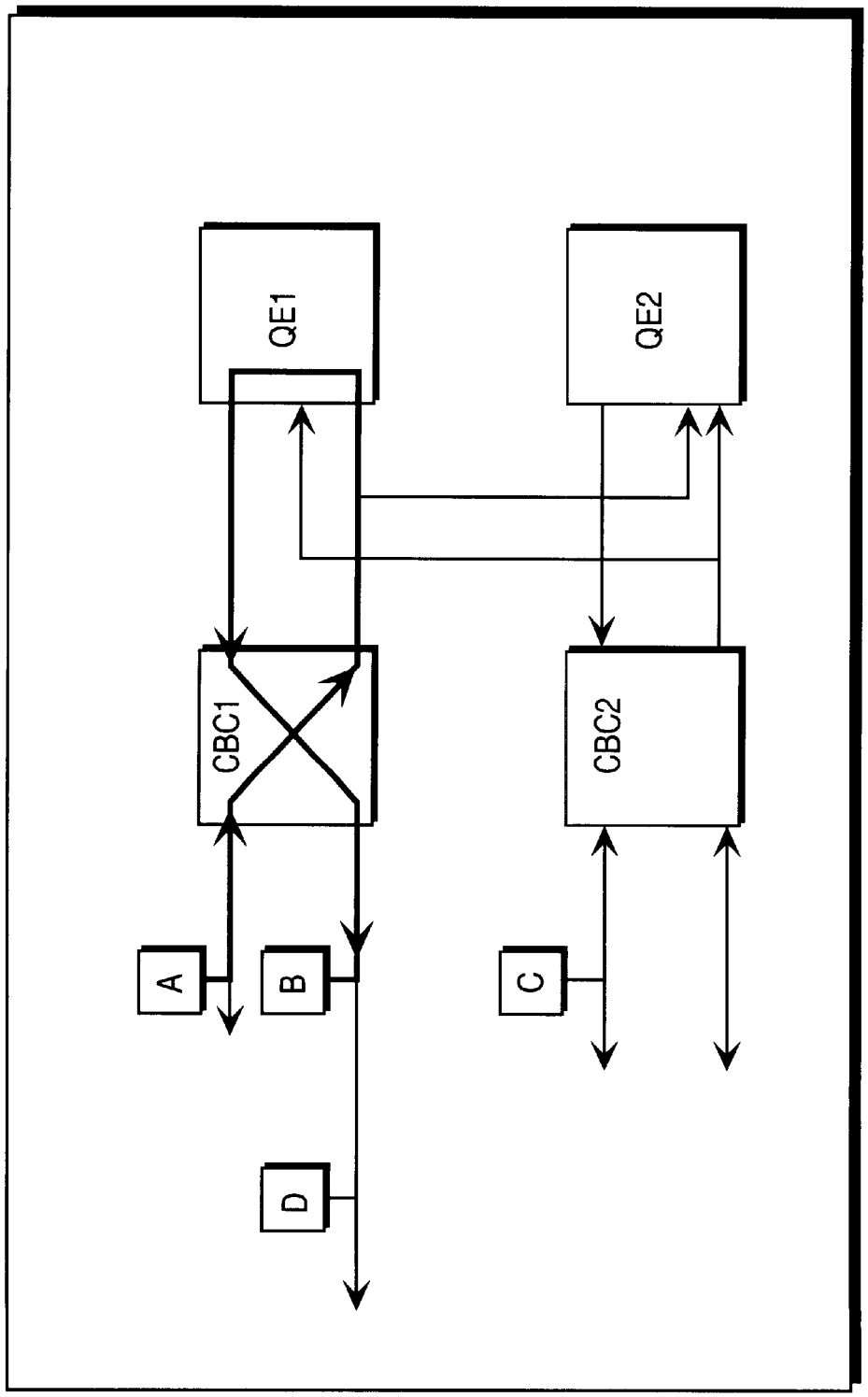
FIG. 26 is a service module configuration of one embodiment in which service module A communicates with service module B.

FIG. 26 is a service module configuration of one embodiment in which service module A (SM A) communicates with service module B (SM B). In this example, SM A and SM B are controlled by the same CBC CBC1, but each SM could be controlled by different CBCs. When one service module sends cell traffic, or traffic, to another service module, the traffic goes through a series of steps in being routed. The primary CBH entry is used. The cell traffic is received by the CBC controlling the source service module. In the CBH, the 5-bit Target Slot ID specifies the target service module. The CBC looks into the QE destination register to find out to which QE the traffic should be routed; the traffic is then routed to that QE. Once the current QE receives the cell traffic, it will forward the cell traffic to the proper CBC, depending on its LCN entry; the CBC uses an address to index into the Address Map RAM for this information. The CBC uses the LCN number to get the CBH from the CBH RAM. When a service module fails, the redundant service module can be either on the same CBC or on another CBC.

Figure 27:
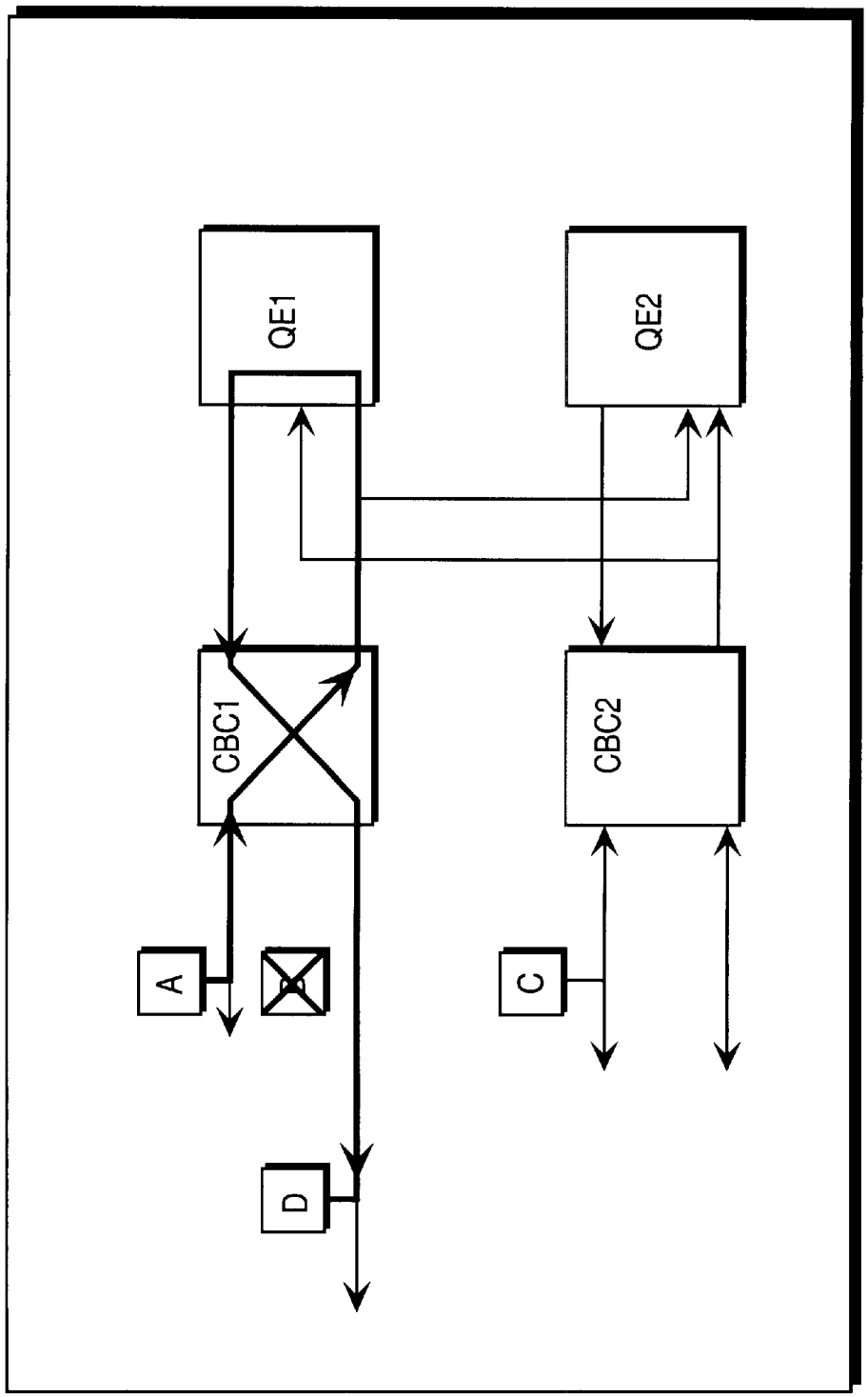
FIG. 27 is a service module configuration of one embodiment in which a service module fails and a redundant service module is on the same CBC as the failed service module.

FIG. 27 is a service module configuration of one embodiment in which a service module SM B fails and the redundant service module D (SM D) is on the same CBC CBC1 as the failed service module SM B. When SM B fails, the redundant SM D takes over, wherein SM D is controlled by the same CBC CBC1 as SM B. In replacing SM B with SM D, SM D is initialized with the information resident in SM B, and the Address Map RAM is changed so that the address for SM B is now pointing to SM D.

Figure 28:
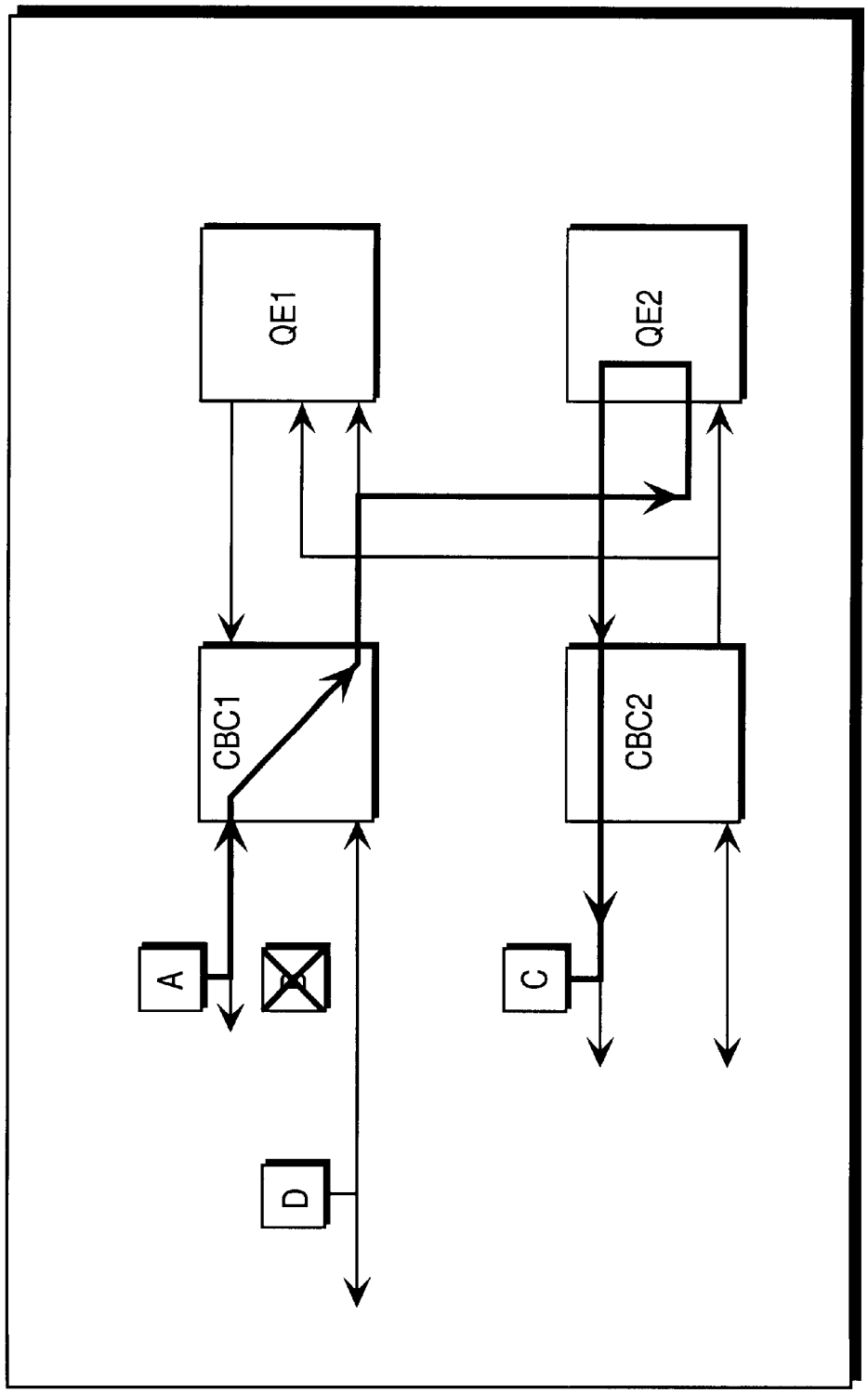
FIG. 28 is a service module configuration of one embodiment in which a service module fails and a redundant service module is on a different CBC from the failed service module.

FIG. 28 is a service module configuration of one embodiment in which a service module SM B fails and the redundant service module C (SM C) is on a different CBC CBC2 from the failed service module. When SM B fails, the redundant SM C takes over, wherein SM C is controlled by a different CBC CBC2 than SM B. In replacing SM B with SM C, SM C is initialized with the information resident in SM B. In CBC1, the QE-destination register is modified to have traffic to SM B forwarded to QE2. In CBC2, the Address Map RAM is modified to have traffic intended for SM B forwarded to SM C. In CBC2, the Address Map RAM is modified to use the alternate CBH entry. In CBC2, the QE-destination register is modified to have traffic to SM A forwarded to QE1.

In one embodiment, each CBC supports 26 devices comprising 24 cell bus service modules (8 service modules per cell bus), a PSM Card, and a Multicast Engine, but the embodiment is not so limited. As the corresponding firmware and software deals with the CBC devices in a 5-bit Logic Slot ID, a mapping of Logical Slot ID to Cell Bus Number and Physical Slot ID is used, but the embodiment is not so limited. Furthermore, the firmware and software transmits cells to the CBC ASIC via the QE. As the QE Chip has 16 polling addresses, another level of mapping is used.

Figure 29:
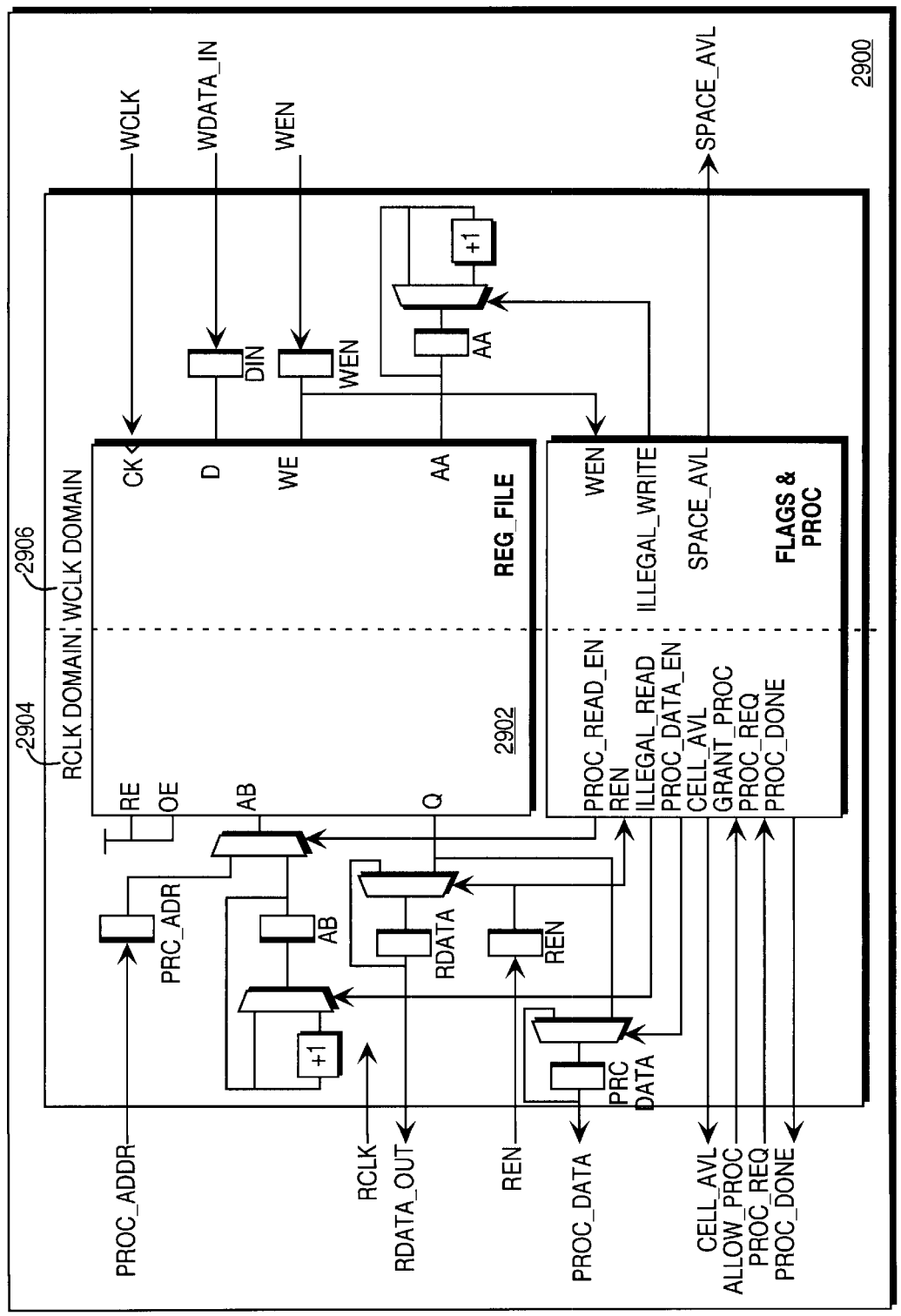
FIG. 29 is a parameterized bi-directional synchronous cell FIFO with loopback and processor access interface implemented in the CBC of one embodiment.

A parameterized bidirectional synchronous cell FIFO with loopback and processor access interface is used for the ingress and egress FIFOs of both the CBM and the CBS, as described herein, but the embodiment is not so limited. The FIFO of one embodiment provides synchronous parameterized first-in first-out memory functions for bi-directional traffic. FIG. 29 is a parameterized bi-directional synchronous cell FIFO 2900 with loopback and processor access interface implemented in the CBC of one embodiment. A two-port REG_FILE 2902 is used as the memory block, wherein the REG_FILE 2902 is synchronous write and asynchronous read. An asynchronous interface is used for communication between the read 2904 and the write domain 2906, wherein the read ports and the write ports of each uni-directional FIFO are asynchronous to each other. The read and write logic is controlled by the clock of their respective domains 2904–2906. Programmable parameters are used to customize the FIFO 2900, wherein the cell size, or number of words per cell, and the word size, or number of bits per word, are both programmable, or parameterized. FIG. 30 lists the configuration parameters of the bi-directional FIFOs of the CBC of one embodiment. FIG. 31 lists the input/outputs (I/Os) and a corresponding interface description for the bi-directional FIFOs of the CBC of one embodiment.

Specifically, the parameterized bidirectional FIFO unit controls cell traffic in a switch platform using a first and a second unidirectional FIFO buffer. The first and second unidirectional FIFO buffers each comprise asynchronous read and write ports. A cell size of the first and second unidirectional FIFO buffers is programmable. Furthermore, a word size of the first and second unidirectional FIFO buffers is programmable. The bi-directional FIFO unit is coupled to write at least one cell from and read at least one cell to at least one asynchronous transfer mode (ATM) interface, at least one frame relay interface, at least one voice interface, and at least one data interface, but the embodiment is not so limited. As such, the first unidirectional FIFO buffer is coupled to write at least one cell from an ATM interface, a frame relay interface, a voice interface, and a data interface. The first unidirectional FIFO buffer is coupled to read at least one cell to at least one switch, wherein the switch handles cells from sources having a number of bandwidths. The switch is coupled to route the at least one cell to an OC12 trunk line and to at least one service module. The service module is coupled to provide the cell to at least one service subscriber using T1, E1, T3, E3, OC3, and OC 12 ports, but the embodiment is not so limited.

The second unidirectional FIFO buffer is coupled to read at least one cell to an ATM interface, a frame relay interface, a voice interface, and a data interface. Furthermore, the second unidirectional FIFO buffer is coupled to write at least one cell from at least one switch, wherein the switch handles cells from sources having a number of bandwidths. The switch may be coupled to route the cell from an OC12 trunk line and from a service module. The service module is coupled to provide the cell to at least one service subscriber using T1, E1, T3, E3, OC3 , and OC 12 ports, but the embodiment is not so limited. Invalid cells may be discarded from each unidirectional FIFO buffer, but the embodiment is not so limited.

Figure 32:
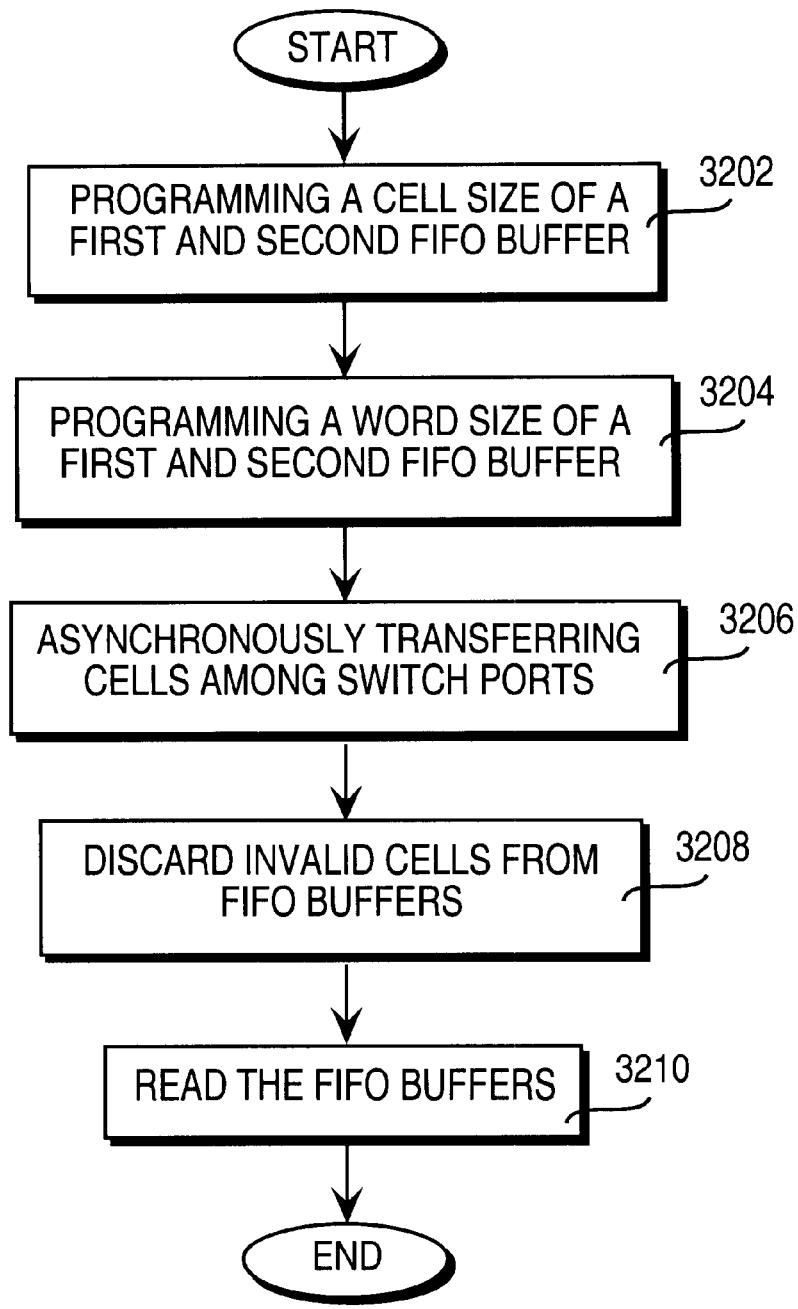
FIG. 32 is a flowchart for controlling cell traffic in a switch platform of one embodiment.

FIG. 32 is a flowchart for controlling cell traffic in a switch platform. Operation begins at step 3202, at which a cell size of each of a first and second unidirectional FIFO buffers is programmed. A word size of each of the first and second unidirectional FIFO buffers is programmed, at step 3204. At least one cell is asynchronously transferred among a number of ports having a number of bandwidths, at step 3206. The asynchronous transfer uses a bidirectional first-in-first-out (FIFO) unit, wherein the bidirectional FIFO unit comprises a first and a second unidirectional FIFO buffer. Invalid cells are discarded from each unidirectional FIFO buffer, at step 3208. A non-destructive read is executed of the bidirectional FIFO unit, at step 3210, while cells are being written to and read from the bidirectional FIFO unit.

The step of asynchronously transferring may comprise the steps of synchronously writing the cell from a port to the first unidirectional FIFO buffer, and synchronously reading the cell from the first unidirectional FIFO buffer to at least one switch, wherein the reading is asynchronous with the writing, but the embodiment is not so limited. Furthermore, the step of asynchronously transferring may comprise the step of synchronously writing at least one cell from the switch to the second unidirectional FIFO buffer, and synchronously reading the cell from the second unidirectional FIFO buffer to a port, wherein the reading is asynchronous with the writing, but the embodiment is not so limited.

In one embodiment, two signals pass through the asynchronous interface, a write_port_increment_read_cell_counter signal, and a read_port_decrement_write_cell_counter signal. As both of these signals are pulses, an asynchronous edge finder is used on each of these signals, but the embodiment is not so limited. The asynchronous edge finder of one embodiment is implemented in three steps. The first step is to make sure the pulse is long enough to be captured. If the signal is going from a fast-clocked register to a slow-clocked register, in order to ensure that the slow-clocked register captures the pulse, the fast-clocked register holds the value for a certain number of cycles. The number of cycles that the value is held is the ratio of the fast clock to the slow clock. For example, if the fast clock is 50 MHz (20 ns period) and the slow clock is 21 MHz (48 ns), then the signal needs to be held for three cycles (20 ns* 3=60 ns>48 ns). This would ensure that the slow-clocked register captures the signal. Signals going from a slow-clocked register to a fast-clocked register do not have to deal with this issue. The second step handles meta-stability using doubling-latching logic. The third step is to capture the edge, wherein simple logic is used to make sure the signal is valid for one cycle in the destination clock domain.

Figure 33:
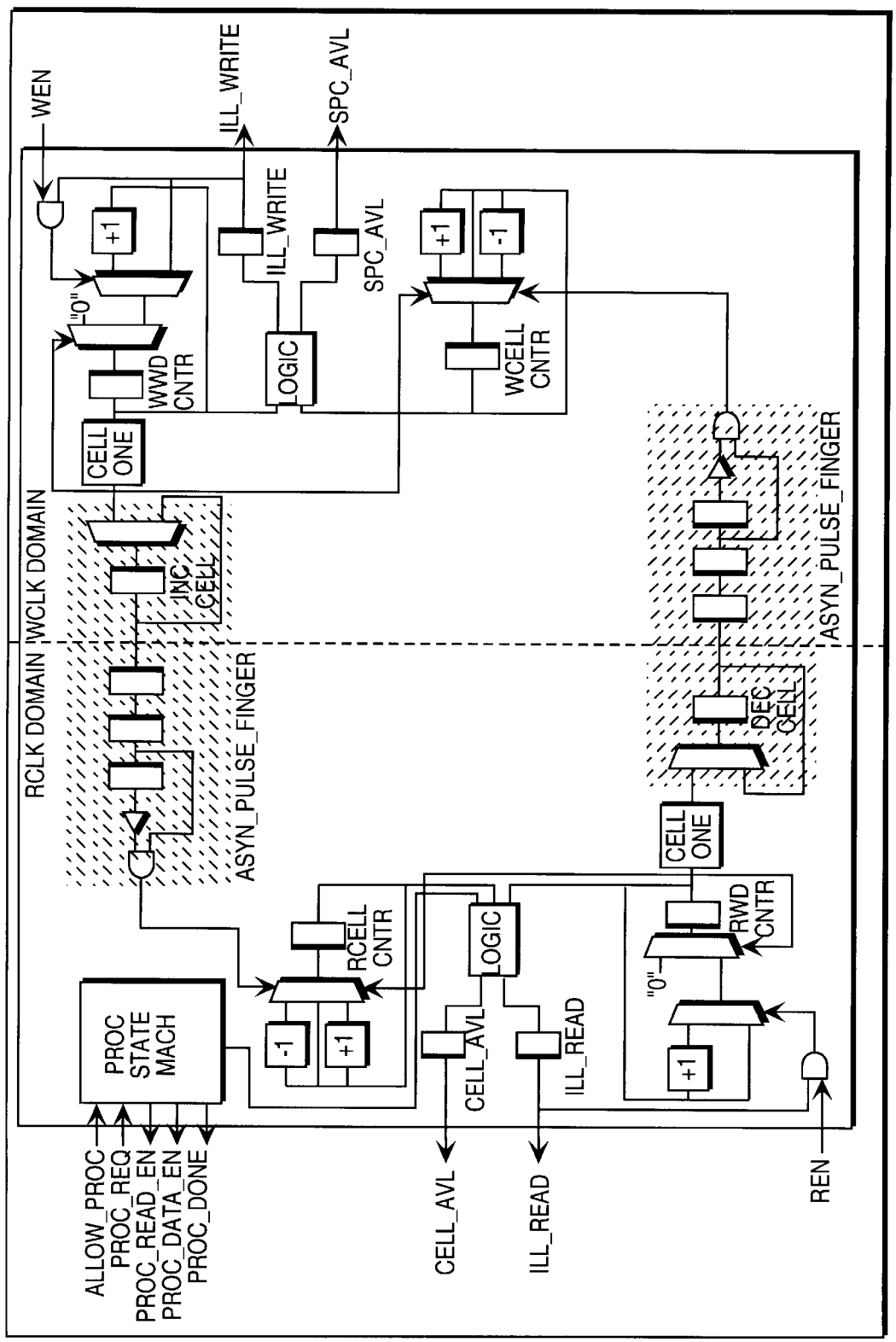
FIG. 33 is a block diagram of the flag generation of one embodiment.

The CBC of one embodiment supports high level flags comprising cell available flags and cell space available flags. FIG. 33 is a block diagram of the flag generation of one embodiment. The flags are based on cell boundaries rather than word boundaries, but the embodiment is not so limited.

A write port of the FIFO uses two counters: a write_word_counter, and a write_cell_counter. The write_word_counter counts the number of words that have been written in a cell. The write_cell_counter counts the number of cells currently in the FIFO. When a whole cell is written into the FIFO, the write_word_counter resets to zero, the write_cell_counter is incremented by one. A signal is sent through the asynchronous interface to notify the read port to increment its read_cell_counter. The space_available flag is based on cell boundaries. If there is one cell space left in the FIFO, as soon as the first word is written into the FIFO, the space_available signal will be turned off. If the FIFO is full, the illegal_write signal will prevent the write_address register from incrementing.

In operation, each unidirectional FIFO buffer of one embodiment outputs a write port cell count from a write port. In one embodiment, a cell count value is programmed at which the write port cell count is outputted. When the write port cell count indicates that the FIFO buffer can not accept additional data or cells, the master bidirectional FIFO unit ceases reading cells to the unidirectional FIFO buffer of the slave bidirectional FIFO unit in response to the write port cell count. Furthermore, the master bidirectional FIFO unit disables a corresponding switch from routing cells to the slave bidirectional FIFO unit in response to the write port cell count; the switch routes the cells to another of the slave bidirectional FIFO units. The write port logic of each unidirectional FIFO buffer is synchronous with a write clock, wherein the write clock operates at a frequency substantially equal to 50 megahertz, but the embodiment is not so limited.

The master bidirectional FIFO unit resumes reading cells to the second unidirectional FIFO buffer of the slave bidirectional FIFO unit in response to a write port cell count indication that the FIFO buffer can accept additional data or cells. In response, the master bidirectional FIFO unit enables an associated switch to route cells to the slave bidirectional FIFO unit.

In addition to the write port cell count, each unidirectional FIFO buffer of one embodiment outputs a status indicating space available in the corresponding unidirectional FIFO buffer for at least one more cell. When the space available status indicates that space is not available in the FIFO buffer for at least one more cell, the master bidirectional FIFO unit ceases reading cells to the unidirectional FIFO buffer of the slave bidirectional FIFO unit in response to the space available status. Furthermore, the master bidirectional FIFO unit disables a corresponding switch from routing cells to the slave bidirectional FIFO unit in response to the space available status; the switch routes the cells to another of the slave bidirectional FIFO units.

The master bidirectional FIFO unit resumes reading cells to the second unidirectional FIFO buffer of the slave bidirectional FIFO unit in response to a status indicating space is available in the FIFO buffer. In response, the master bidirectional FIFO unit enables an associated switch to route cells to the slave bidirectional FIFO unit.

Figure 34:
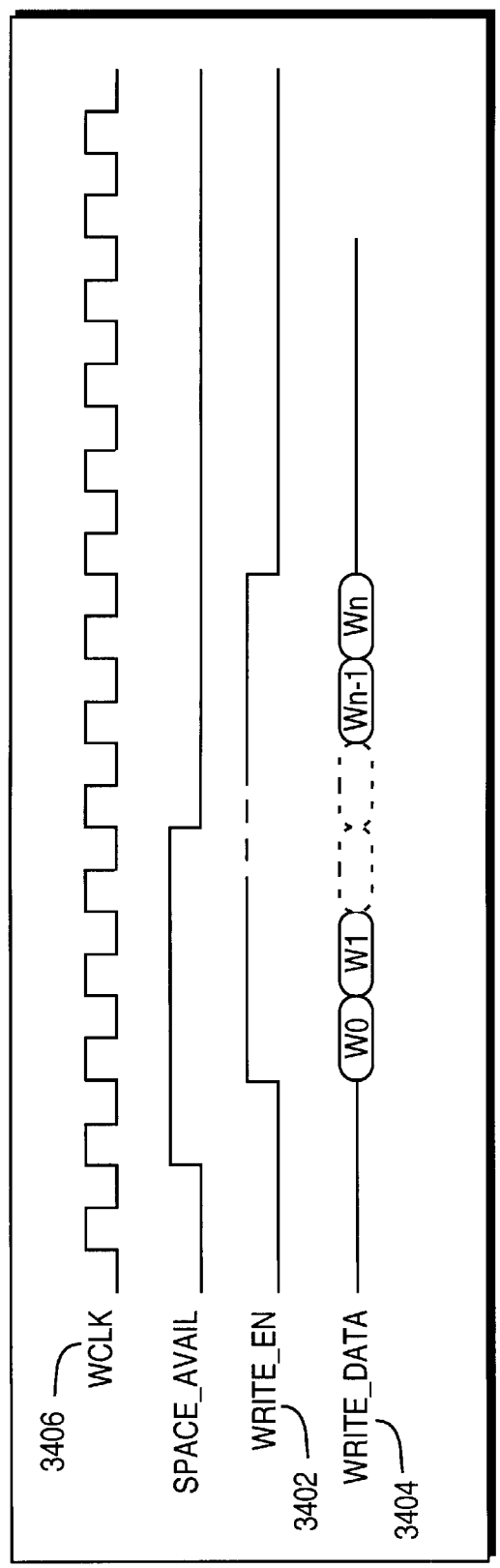
FIG. 34 is a timing diagram of a write port of one embodiment.

FIG. 34 is a timing diagram of a write port of one embodiment. The write_enable 3402 and write_data 3404 inputs are registered on the write clock 3406. An internal writ_address points to the next address to be written.

Each unidirectional FIFO buffer of one embodiment outputs a read port cell count from a read port. The read port cell count is a status indicating space available in the corresponding unidirectional FIFO buffer for at least one more cell. The read port logic of each unidirectional FIFO buffer is synchronous with a read clock. The read clock may operate at a frequency substantially equal to 21 megahertz or 42 megahertz, but the embodiment is not so limited.

A read port of the FIFO uses two counters, a read_word_counter, and a read_cell_counter. The read_word_counter counts the number of words that have been read in a cell. The read_cell_counter counts the number of cells currently in the FIFO. When a whole cell is read from the FIFO, the read_word_counter resets to zero, and the read_cell_counter is decremented by one. A signal is sent through the asynchronous interface to notify the write port to decrement the write_cell_counter. The cell_available flag is on cell boundaries. If there is one cell left in the FIFO, as soon as the first word is read from the FIFO, the cell_available signal is turned off. If the FIFO is empty, the illegal_read signal will prevent the read_address register from incrementing.

Figure 35:
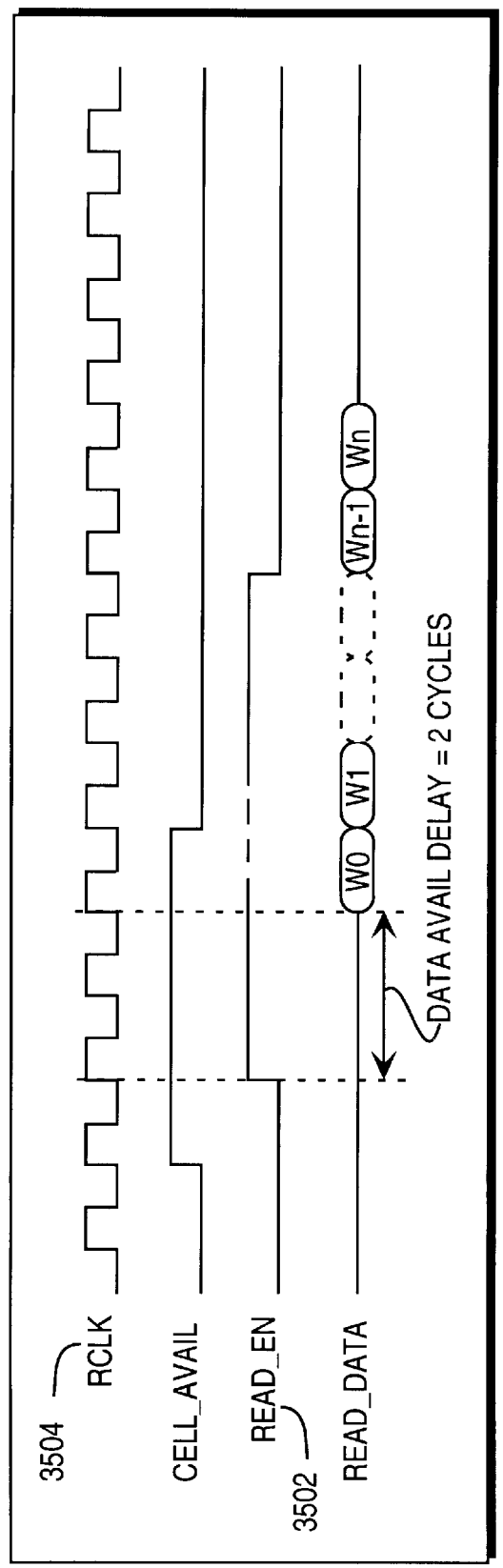
FIG. 35 is a timing diagram of a read port of one embodiment.

FIG. 35 is a timing diagram of a read port of one embodiment. The read_enable input 3502 is registered on the read clock 3504. The REG_FILE already has the next read data available at its output. Once the registered read_enable signal 3502 is active, it will load the data into the read_data_out register. This is the reason for the two clock delays between the read_enable signal 3502 going active and data appearing on the read_data_outport.

Figure 36:
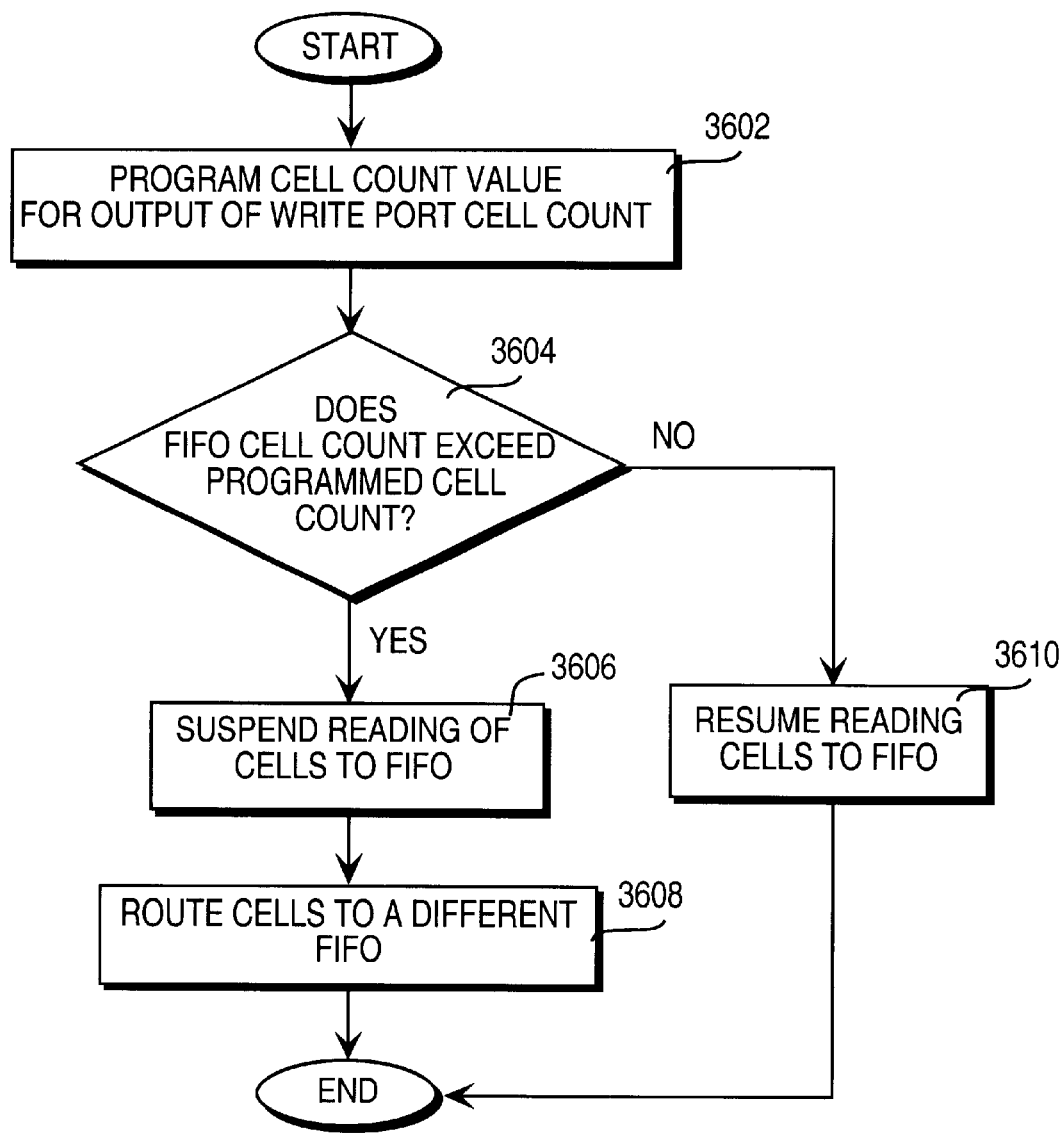
FIG. 36 is a flowchart for providing cell bus management in a switch platform of one embodiment.

FIG. 36 is a flowchart for providing cell bus management in a network switch of one embodiment. Operation begins at step 3602, at which a cell count value is programmed at which a first slave bidirectional FIFO unit outputs a write port cell count. A determination is made, at step 3604, as to whether the cell count of the slave bidirectional FIFO unit exceeds the programmed cell count value. If the cell count exceeds the programmed cell count value, the write port cell count is output from the first slave bidirectional FIFO unit. The reading of cells to the first slave bidirectional FIFO unit is suspended, at step 3606, in response to the write port cell count. Cells are routed to a second slave bidirectional FIFO unit in response to the write port cell count, at step 3608, in response to the suspended reading to the first bidirectional FIFO unit. The rerouted cell is read to the second slave bidirectional FIFO unit in response to the write port cell count. If the write port cell count of the first slave bidirectional FIFO is determined not to exceed the programmed cell count value, or when the write port cell count drops back below the programmed cell count value, reading of the at least one cell to the first slave bidirectional FIFO unit is resumed, at step 3610. Cell bus management in the network switch of one embodiment further comprises outputting a read port cell count, and outputting from at least one read port a status indicating space available in a unidirectional FIFO buffer for at least one more cell.

Cell bus management in the network switch of one embodiment further comprises outputting a status indicating space available for at least one more cell from a first slave bidirectional FIFO unit when a cell count of at least one slave bidirectional FIFO unit exceeds one. Reading of at least one cell to the first slave bidirectional FIFO unit is suspended in response to a status indicating no space available. The cell is routed to a second slave bidirectional FIFO unit in response to a status indicating no space available. The rerouted cell is read to the second slave bidirectional FIFO unit. When the status of the first slave bidirectional FIFO unit again indicates space available in the buffer for at least one more cell, the routing of the at least one cell to the second slave bidirectional FIFO unit is disabled, and reading to the first slave bidirectional FIFO unit is resumed.

A processor port allows a processor to perform a non-destructive read for any address in the FIFO when such action is granted by the read port. A diagnostic interface of the bidirectional FIFO unit supports the non-destructive read of the bidirectional FIFO unit while at least one cell is being written to and read from the bidirectional FIFO unit. At least one cell may be written to the second unidirectional FIFO buffer from the first unidirectional FIFO buffer over a first enabled diagnostic loop. Furthermore, at least one cell may be written to the first unidirectional FIFO buffer from the second unidirectional FIFO buffer over a second enabled diagnostic loop.

Figure 37:
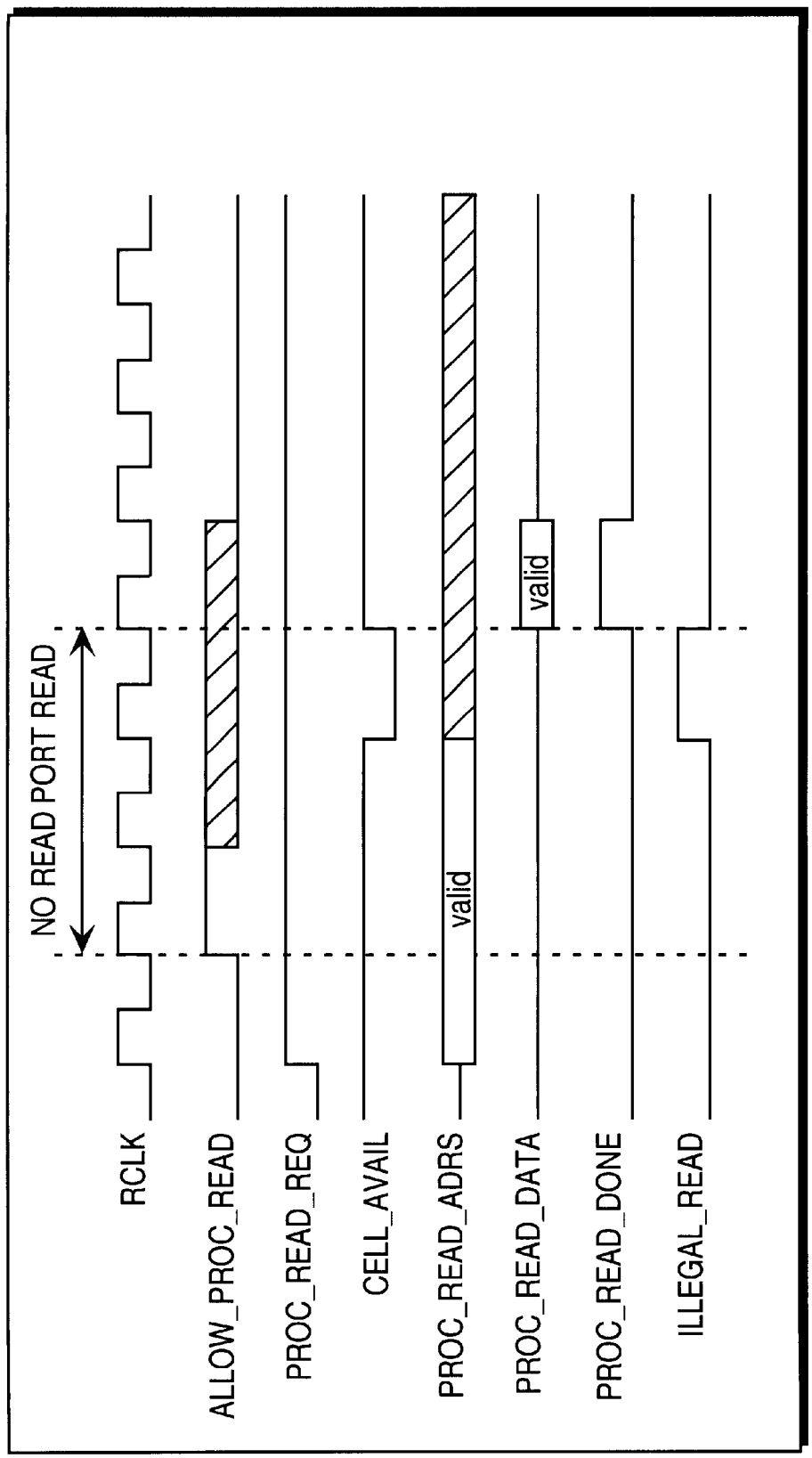
FIG. 37 is a timing diagram of a processor port of one embodiment.

FIG. 37 is a timing diagram of a processor port of one embodiment. The processor port is in the read port clock domain. Once the grant signal and the request signal are active, the processor port read address is substituted for the read port address. After the read is complete, the address register is switched back to the read port address.

In arbitrating slave module requests, the CBM performs arbitration on the requests from the eight slave modules based on a minimum guarantee bandwidth which is set by the ACP for each slave module. A particular slave module will get higher priority if it is not providing the corresponding minimum guarantee bandwidth.

In one embodiment, fair rate-based cell traffic arbitration is provided between eight traffic sources in the form of eight cell bus service modules on the same cell bus, but the embodiment is not so limited. A processor can program the CBC of one embodiment with an 8-bit Relative Service Delay (RSD) value for each of the eight service Modules. This RSD value determines the portion of the total bandwidth of the switch platform reserved for the respective service module. Given the bandwidth requirement for each of the eight service modules, the corresponding RSD values can be calculated using the formula $$RSDi = \frac{\frac{1}{BWi}}{\sum_{n=1}^{8} \frac{1}{BWn}},$$

wherein RSDi is the relative service delay for the ith service module, and BWi is the bandwidth requirement for the ith service module. In one embodiment, a bandwidth allocation for a service module is performed according to the formula $$BWi = \frac{\frac{1}{RSDi}}{\sum_{n=1}^{8} \frac{1}{RSDi}},$$

wherein RSDi is the RSD value for the service module, but the embodiment is not so limited. If the bandwidth is under-subscribed, the remaining bandwidth is shared among all eight service modules according to the RSD value of each service module. If the bandwidth is over-subscribed, each service module will have the assigned bandwidth portion decreased according to the RSD values.

Figure 38:
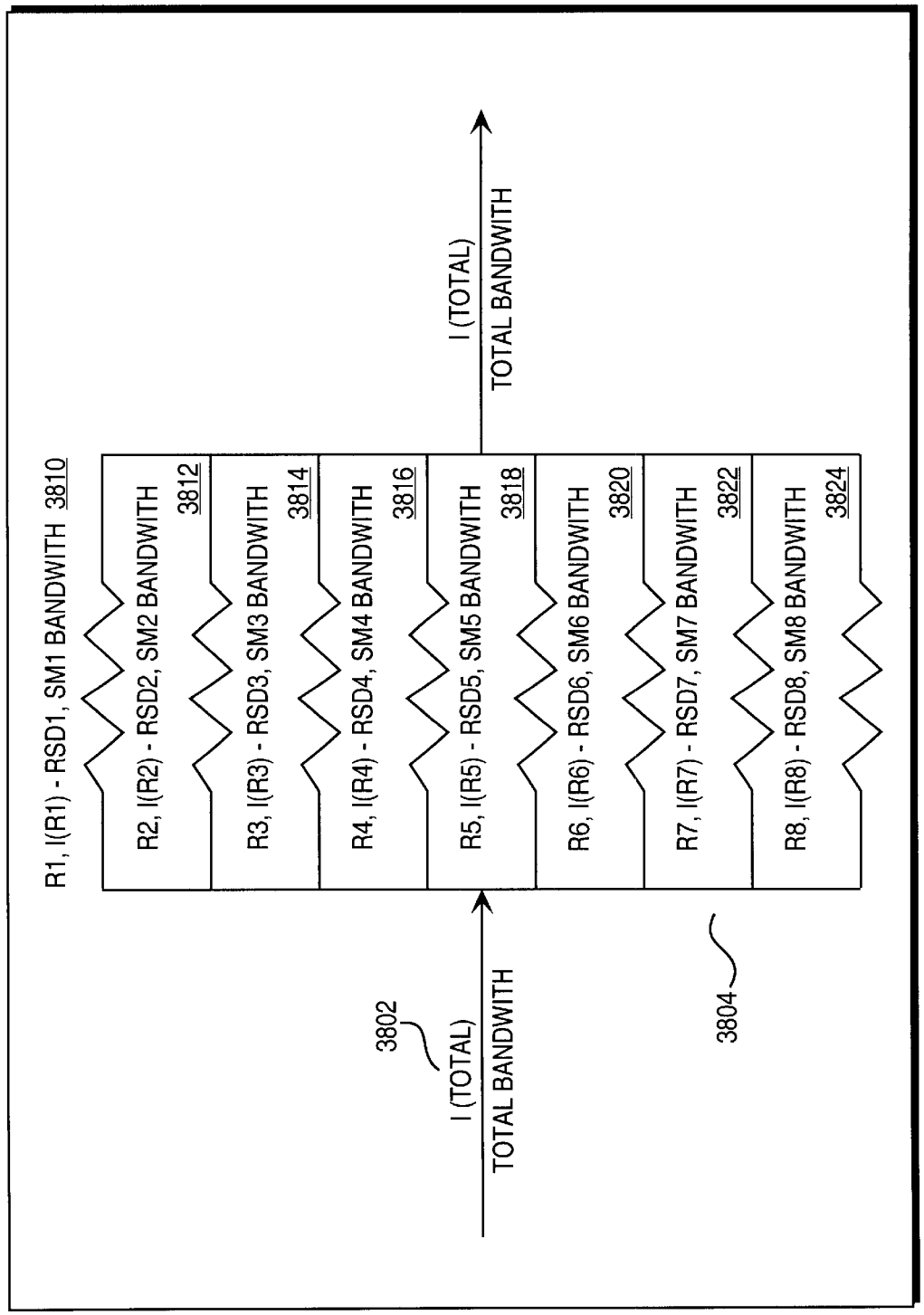
FIG. 38 is a bandwidth distribution of one embodiment using a parallel resistor network model.

The rate-based cell traffic arbitration scheme of one embodiment is to analogous to a parallel resistor network comprising eight resistors. FIG. 38 is a bandwidth distribution of one embodiment using a parallel resistor network model. The current 3802 flowing into the resistor network 3804 can be thought of as the total bandwidth supported by the CBM. The resistance value of each resistor 3810–3824 can be thought of as the RSD value for each service module. The current that flows across each resistor can be thought of as the portion of the total bandwidth allocated for the service module.

In operation, each service module comprises an 8-bit RSD register that is configured by the system processor, or ACP, using the RSD value. The value for each RSD is calculated based on the bandwidths allotted for each service module. Furthermore, each service module uses an 8-bit Service Delay Accumulator (SDA) register. The SDA register of each service module is configured using the SDA value, wherein the SDA register keeps track of when each of the service modules should receive service.

The SDA value is calculated at each cell bus frame time for each of the service modules based on the RSD value for each of the service modules, a request for service, and the minimum SDA value among the service modules during a cell bus frame time. In one embodiment, arbitration logic searches the SDA values of each of the service modules for a minimum SDA value, wherein the service module having the minimum SDA value and requesting service is selected for service. The SDA register of the service module having the minimum SDA value is configured with the RSD value when the service module is serviced. Each of the SDA registers of each of the service modules that do not have the minimum SDA value are configured with the result of the SDA value of the service module minus the minimum SDA value. In one embodiment, the SDA value is calculated for each clock cycle, but the embodiment is not so limited.

Figure 39:
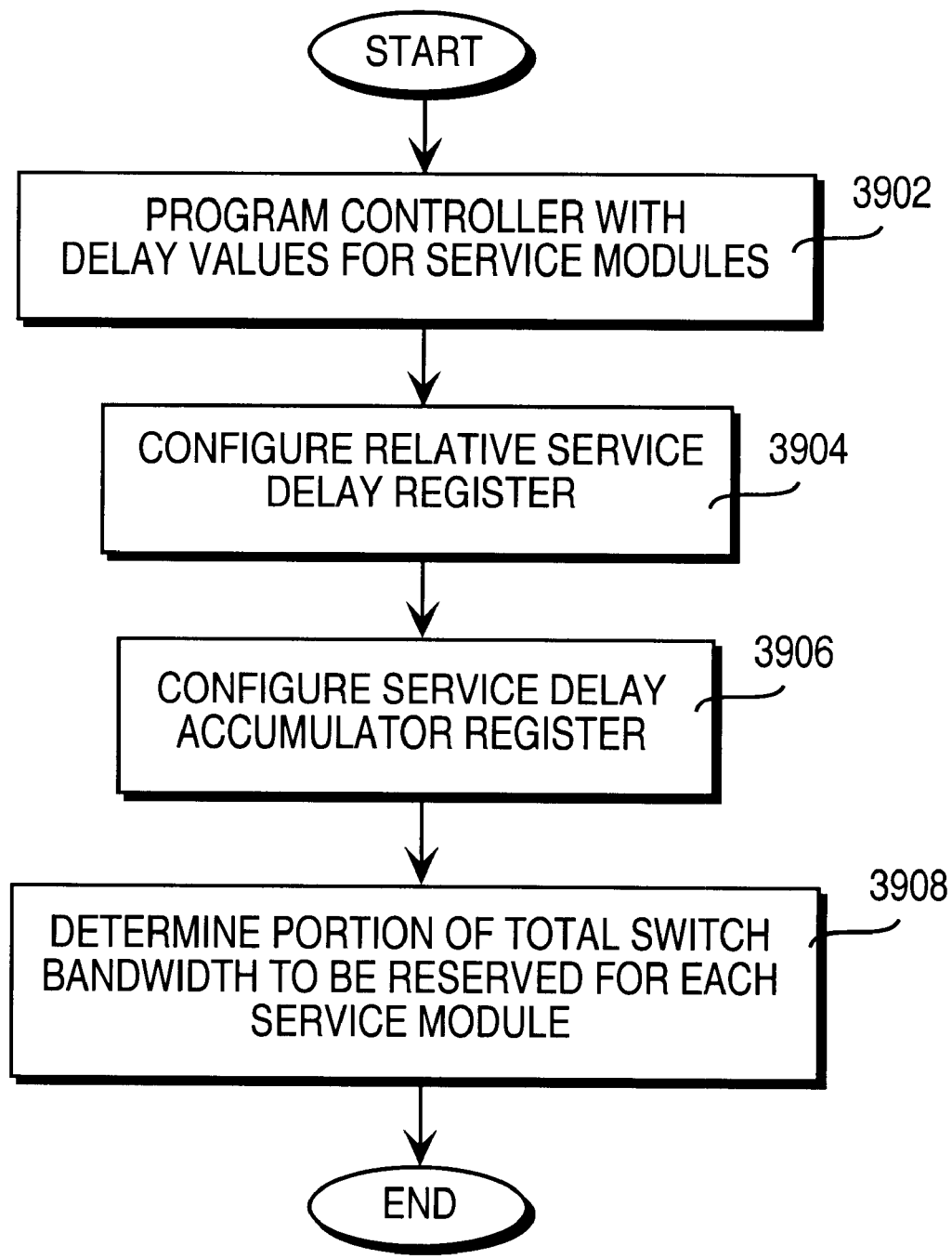
FIG. 39 is a flowchart for providing cell traffic arbitration in a switch platform of one embodiment.

FIG. 39 is a flowchart for providing cell traffic arbitration in a switch platform of one embodiment. Operation begins at step 3902, at which at least one cell bus controller is programmed with at least one delay value for each of a number of service modules. The delay value determines a portion of a total bandwidth of the switch platform reserved for each of the service modules. The delay value comprises a relative service delay (RSD) value and a service delay accumulator (SDA) value, but the embodiment is not so limited. An 8-bit RSD register of each of the service modules is configured, at step 3904, using the RSD value. An 8-bit SDA register of each of the service modules is configured, at step 3906, using the SDA value, wherein the SDA register keeps track of when each of the plurality of service modules receives service. A determination is made, at step 3908, as to a portion of the total switch bandwidth to be reserved for each service module. When the total switch bandwidth is under-subscribed, the remaining bandwidth is shared among the number of service modules. When the total switch bandwidth is over-subscribed, a portion of the total bandwidth allocated to at least one service module is decreased according to the RSD value.

The SDA value is calculated for each of the service modules at each cell bus frame time based on the RSD value for each of the service modules, a request for service, and the minimum SDA value among the service modules during a cell bus frame time. The SDA values of each of the service modules are then searched for a minimum SDA value, wherein the service module having the minimum SDA value and requesting service is selected for service. The SDA register of the service module having the minimum SDA value is configured with the RSD value when the service module is serviced. Each of the SDA registers of each of the service modules that do not have the minimum SDA value are configured with the result of the SDA value of the service module minus the minimum SDA value.

The CBC of one embodiment comprises diagnostic logic that assists in carrying out diagnostic functions. The diagnostic logic supported comprises: an interface loopback; a cell bus master-slave loopback, wherein a CBS loops back to any one CBM in the ingress direction, and the same selected CBM loops back to a CBS in the egress direction; an individual cell bus loopback; and an enable control for individual modules and functions.

Figure 40:
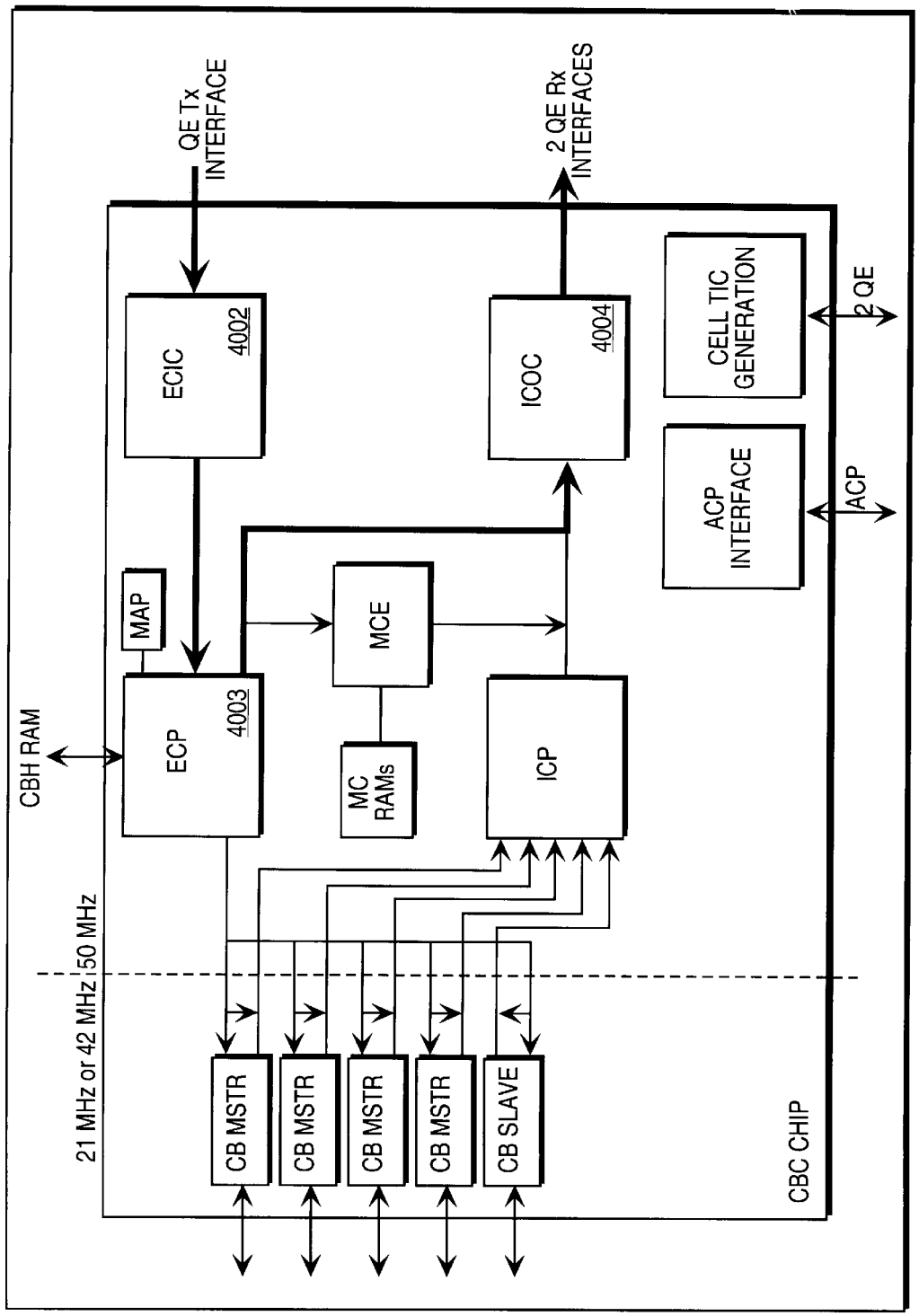
FIG. 40 is a block diagram of an interface loopback of one embodiment.

FIG. 40 is a block diagram of an interface loopback of one embodiment. When the interface loopback mode is enabled, incoming cells will not be processed by the CBC but, instead, will be looped back from the ECIC 4002 to the ICOC 4004 and be sent back to the QE. Parity checking of incoming cells will be performed in the ECP 4003.

Figure 41:
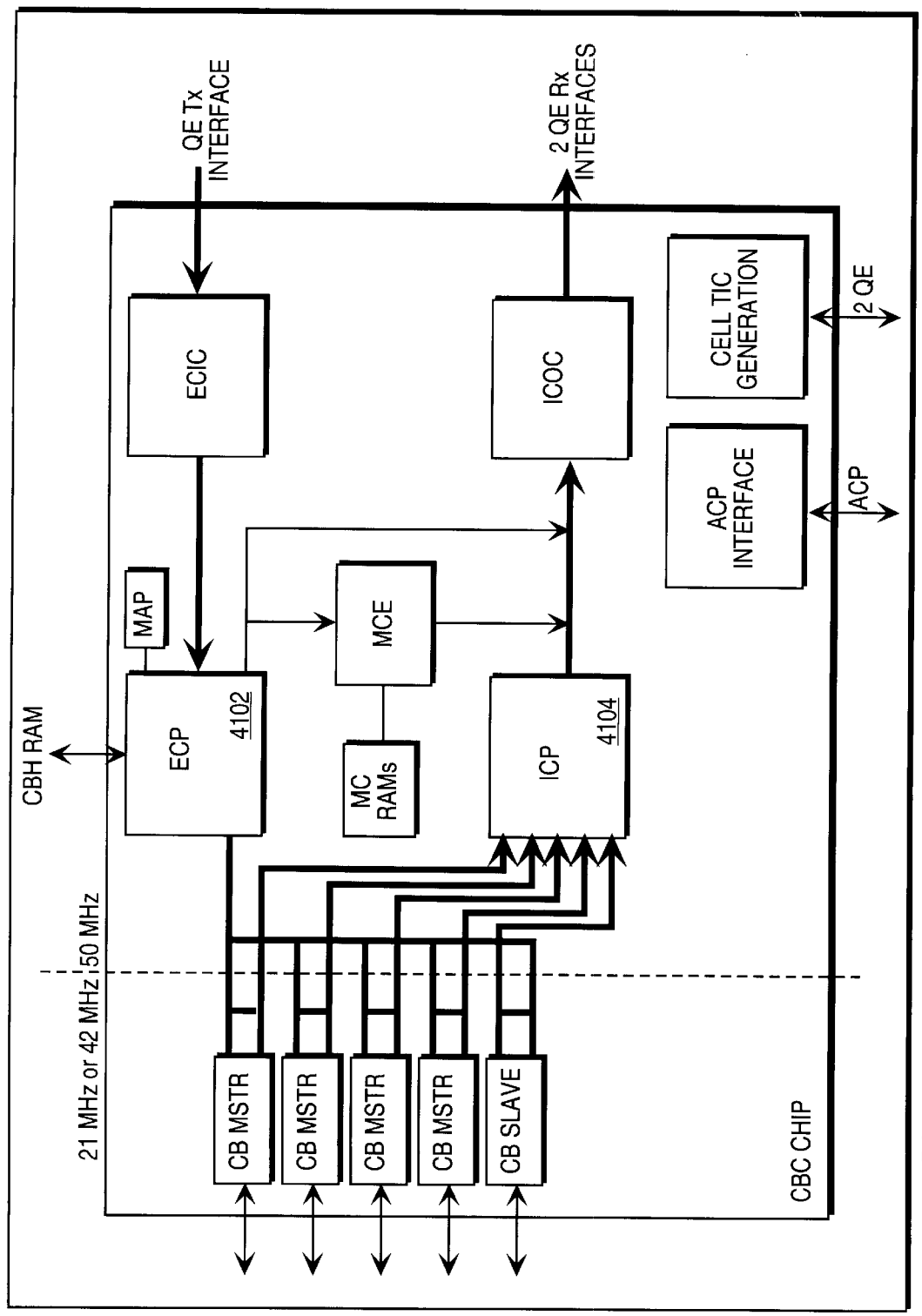
FIG. 41 is a block diagram of an individual cell bus loopback of one embodiment.

FIG. 41 is a block diagram of an individual cell bus loopback of one embodiment. When the individual cell bus loopback is selected, each cell bus will loopback onto itself. Basically, the cell from the ECP 4102 will be looped back to the ICP 4104. When this loopback is selected, five cell buses go into loopback together.

Several functions of the CBC may be disabled in order to stop cell traffic through the CBC. Cell traffic is stopped so that the CBM and CBS FIFOs and queues can be monitored for cell progression through the CBC. The following modules and functions may be selectively disabled, but the embodiment is not so limited: the transmission of cells to the QEs by the ICOC; the transmission of cells to the ICOC by the MCE; the transmission of cell bus cells from the CBMs to the corresponding cell buses; and, the transmission of cell bus cells from the CBS to the slave cell bus.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for providing cell bus management in a switch platform, the apparatus comprising:
   at least one master and at least one slave bidirectional first-in-first-out (FIFO) unit, each bidirectional FIFO unit comprises a first and a second unidirectional FIFO buffer, each unidirectional FIFO buffer having a write port, the write port for each of the first and second unidirectional FIFO buffers is to output a write port cell count indicating if the first or second unidirectional FIFO buffers is able to accept a cell.

2. The apparatus of claim 1, wherein the at least one master bidirectional FIFO unit is to cease reading at least one cell from the second unidirectional FIEFO buffer of the at least one slave bidirectional FIFO unit in response to the write port cell count of the second unidirectional FIFO buffer.

3. The apparatus of claim 1, wherein the at least one master bidirectional FIFO unit is to disable at least one switch in the switch platform from routing at least one cell to the at least one slave bidirectional FIFO unit in response to the write port cell count of the second unidirectional FIFO buffer.

4. The apparatus of claim 3, wherein the at least one switch in the switch platform is to route the at least one cell to another slave bidirectional FIFO unit in response to the write port cell count of the second unidirectional FIFO buffer.

5. The apparatus of claim 2, wherein the at least one master bidirectional FIFO unit is to resume reading the at least one cell from the second unidirectional FIFO buffer of the at least one slave bidirectional FIFO unit in response to the write port cell count of the second unidirectional buffer.

6. The apparatus of claim 1, wherein the at least one master bidirectional FIFO unit is to enable at least one switch in the switch platform to route at least one cell to the at least one slave bidirectional FIFO unit in response to the write port cell count of the second unidirectional buffer.

7. The apparatus of claim 1, wherein the at least one slave bidirectional FIFO unit is programmed to output the write port cell count at a certain count value.

8. The apparatus of claim 1, wherein one master bidirectional FIFO unit is coupled to eight slave bidirectional FIFO units.

9. The apparatus of claim 1, wherein each unidirectional FIFO buffer includes asynchronous read and write ports.

10. The apparatus of claim 1, wherein the write port of each unidirectional FIFO buffer is to output a status indicating space available in the unidirectional buffer for at least one more cell.

11. The apparatus of claim 10, wherein the at least one master bidirectional FIFO unit is to cease reading at least one cell from the second unidirectional FIFO buffer of the at least one slave bidirectional FIFO unit in response to the status indicating space available in the unidirectional buffer for at least one more cell.

12. The apparatus of claim 10, wherein the at least one master directional FIFO unit is to disable at least one switch in the switch platform from routing at least one cell to the at least one slave bidirectional FIFO unit in response to the status indicating space available in the unidirectional buffer for at least one more cell.

13. The apparatus of claim 12, wherein the at least one switch in the switch platform is to route the at least one cell to another slave bidirectional FIFO unit in response to the status indicating space available in the unidirectional buffer for at least one more cell.

14. The apparatus of claim 11, wherein the at least one master bidirectional FIFO unit is to resume reading the at least one cell to the second unidirectional FIFO buffer of the at least one slave bidirectional FIFO unit in response to the status indicating space available in the unidirectional buffer for at least one more cell.

15. The apparatus of claim 10, wherein the at least one master bidirectional FIFO unit is to enable at least one switch in the switch platform to route at least one cell to the at least one slave bidirectional FIFO unit in response to the status indicating space available in the unidirectional buffer for at least one more cell.

16. The apparatus of claim 1, wherein each unidirectional PFIO buffer includes a read port, the read port is to output a read port cell count, and wherein the unidirectional FIFO buffer is to output a status indicating space available in the unidirectional FIFO buffer for at least one more cell.

17. The apparatus of claim 1, wherein a cell size and a word size of each unidirectional FIFO buffer is programmable.

18. The apparatus of claim 1, wherein the at least one bidirectional FIFO unit is to write at least one cell to and read at least one cell from at least one asynchronous transfer mode (ATM) interface, at least one frame relay interface, at least one voice interface, at least one data interface, and at least one switch interface.

19. The apparatus of claim 1, wherein the first unidirectional FIFO buffer is to read at least one cell from at least one switch in the switch platform, wherein the at least one switch is to handle cells from sources having a plurality of bandwidths.

20. The apparatus of claim 19, wherein the at least one switch is to route the at least one cell to an OC12 trunk line and to at least one service module.

21. The apparatus of claim 20, wherein the at least one service module is to provide the at least one cell to at least one service subscriber using T1, E1, T3, E3, OC3, and OC 12 ports.

22. The apparatus of claim 1, wherein the at least one bidirectional FIFO unit comprises a diagnostic interface, wherein the diagnostic interface is to support a non-destructive read of the at least one bidirectional FIFO unit if at least one cell is being written to and read from the at least one bidirectional FIFO unit.

23. The apparatus of claim 1, wherein the at least one cell is to be written to the second unidirectional FIFO buffer from the first unidirectional FIFO buffer over a first enabled diagnostic loop.

24. The apparatus of claim 9, wherein a write port logic of each unidirectional FIFO buffer is synchronous with a write clock, and wherein a read port logic of each unidirectional FIFO buffer is synchronous with a read clock.

25. The apparatus of claim 1, wherein at least one invalid cell can be discarded from each unidirectional FIFO buffer.

26. A network switch platform comprising:
at least one service module;
at least one cell bus controller coupled among the at least one service module and at least one switch;
at least one slave bidirectional first-in-first-out (FIFO) unit located in the at least one service module; and
at least one master bidirectional FIFO unit located in the at least one cell bus controller, wherein each bidirectional FIFO unit comprises a first and a second unidirectional FIFO buffer, wherein the second unidirectional FIFO buffer of the at least one slave bidirectional FIFO unit includes a write port, the write port is to output a write port cell count and a status indicating space available in the second unidirectional FIFO buffer for at least one more cell, wherein the at least one slave bidirectional FIFO unit is programmed to output the write port cell count from the write port of the second unidirectional FIFO buffer at a certain count value.

27. The network switch platform of claim 26, wherein the at least one master bidirectional FIFO unit is to cease reading at least one cell from the second unidirectional FIFO buffer of the at least one slave bidirectional FIFO unit in response to the write port cell count, wherein the at least one master bidirectional FIFO unit is to disable at least one switch from routing at least one cell to the at least one slave bidirectional FIFO unit in response to the write port cell count, wherein the at least one switch is to route the at least one cell to another of the at least one slave bidirectional FIFO units in response to the write port cell count.

28. The network switch platform of claim 27, wherein the at least one master bidirectional FIFO unit is to resume reading at least one cell from the second unidirectional FIFO buffer of the at least one slave bidirectional FIFO unit in response to the write port cell count, wherein the at least one master bidirectional FIFO unit is to enable the at least one switch to route at least one cell to the at least one slave bidirectional FIFO unit in response to the write port cell count.

29. The network switch platform of claim 26, wherein the at least one master bidirectional FIFO unit is to cease reading at least one cell from the second unidirectional FIFO buffer of the at least one slave bidirectional FIFO unit in response to the status indicating space available in the unidirectional buffer for at least one more cell, wherein the at least one master bidirectional FIFO unit is to disable at least one switch from routing at least one cell to the at least one slave bidirectional FIFO unit in response to the status indicating space available in the unidirectional buffer for at least one more cell, wherein the at least one switch is to route the at least one cell to another of the at least one slave bidirectional FIFO units in response to the status indicating space available in the unidirectional buffer for at least one more cell.

30. The network switch platform of claim 29, wherein the at least one master bidirectional FIFO unit is to resume reading at least one cell from the second unidirectional FIFO buffer of the at least one slave bidirectional FIFO unit in response to the status indicating space available in the bidirectional buffer for at least one more cell, wherein the at least one master bidirectional FIFO unit enables the at least one switch to route at leas tone cell to the at least one slave bidirectional FIFO unit in response to the status indicating space available in the unidirectional buffer for at least one more cell.

31. The network switch platform of claim 26, wherein each unidirectional FIFO buffer is to output a read port cell count, each unidirectional FIFO buffer includes a read port to output a status indicating space available in the unidirectional FIFO buffer for at least one more cell.

32. The network switch platform of claim 26, wherein a cell size and a word size of the first and second unidirectional FIFO buffers are programmable.

33. The network switch platform of claim 26, wherein each of the at least one bidirectional FIFO units is coupled to write at least one cell from and read at least one cell to at least one asynchronous transfer mode (ATM) interface, at least one frame relay interface, at least one voice interface, at least one data interface, and at least one switch interface.

34. The network switch platform of claim 26, wherein each unidirectional FIFO buffer comprises asynchronous read and write ports, write port logic, and read port logic, and wherein the write port logic is synchronous with a write clock, and wherein the read port logic is synchronous with a read clock.

35. The network switch platform of claim 26, further comprising at least one diagnostic interface, wherein the at least one diagnostic interface is to support a non-destructive read of at least one bidirectional FIFO unit if at least one cell is being written to and read from the at least one bidirectional FIFO unit.

36. A method for providing cell bus management in a network switch, the method comprising:

programming a cell count value to determine if a first slave bidirectional FIFO unit is to output a write port cell count from a write port;

outputting the write port cell count from the first slave bidirectional FIFO unit if the write port cell count of the first slave bidirectional FIFO unit is to exceed the programmed cell count value; and suspending reading of at least one cell from the first slave bidirectional FIFO unit in response to the write port cell count.

37. The method of claim 36, further comprising:

routing the at least one cell to a second slave bidirectional FIFO unit in response to the write port cell count;

reading the at least one cell from the second slave bidirectional FIFO unit in response to the write port cell count;

disabling the routing of the at least one cell to the second slave bidirectional FIFO unit in response to the write port cell count; and resuming reading of the at least one cell to the first slave bidirectional FIFO unit in response to the write port cell count.

38. The method of claim 36, further comprising:

outputting a read port cell count; and outputting from at least one read port a status indicating space available in a unidirectional FIFO buffer for at least one more cell.

39. The method of claim 36, further comprising:

programming a cell size of each of the slave bidirectional FIFO units; and programming a word size of each of the slave bidirectional FIFO units.

40. The method of claim 37, further comprising:

synchronously writing at least one cell from at least one port to at least one bidirectional FIFO unit, when rein the at least one port is coupled to at least one source having at least one bandwidth;

asynchronously transferring the at least one cell through the at least one bidirectional FIFO unit; and synchronously reading the at least one cell from the at least one bidirectional FIFO unit to the at least one port.

41. The method of claim 40, wherein the at least one port comprises at least one asynchronous transfer mode (ATM) interface, at least one frame relay interface, at least one voice interface, at least one data interface, at least one switch interface, at least one OC12 interface, and at least one OC3 interface.

42. The method of claim 37, further comprising:

discarding at least one invalid cell from each bidirectional FIFO unit; and executing a non-destructive read of the at least one bidirectional FIFO unit if at least one cell is being written to and read from the at least one bidirectional FIFO unit.

43. A method for providing cell bus management in a network switch, the method comprising:

outputting a status indicating space available for at least one more cell from a write port of a first slave bidirectional FIFO unit if a cell count of the first slave bidirectional FIFO unit is to exceed one; and suspending reading of at least one cell from the first slave bidirectional FIFO unit in response to the outputted status.

44. The method of claim 43, further comprising:

routing the at least one cell to a second slave bidirectional FIFO unit in response to the status;

reading the at least one cell to the second slave bidirectional FIFO unit in response to the status;

disabling the routing of the at least one cell to the second slave bidirectional FIFO unit in response to the status; and resuming reading of the at least one cell to the first slave bidirectional FIFO unit in response to the status.

45. A switch platform, comprising:

at least one bidirectional buffering unit, the at least one bidirectional buffering unit including:

a first and second unidirectional buffer, each unidirectional buffer having a write port to output a write port cell count indicating if the unidirectional buffer is able to receive cells.

46. The switch platform of claim 45, wherein the at least one bidirectional buffering unit is a first-in-first-out (FIFO) buffering unit.

47. The switch platform of claim 45, wherein the first and second unidirectional buffers are unidirectional FIFO buffers.

* * * * *